US 6,629,399 B2

(12) United States Patent
Sarles et al.

(10) Patent No.: US 6,629,399 B2
(45) Date of Patent: Oct. 7, 2003

(54) INDUCTION FOIL CAP SEALER EMPLOYING LITZ WIRE COIL

(75) Inventors: Frederick W. Sarles, Lexington, MA (US); Douglas A. Johnson, Groveland, MA (US)

(73) Assignee: Kaps-All Packaging Systems Inc., Riverhead, NY (US)

(*) Notice: Subject to any disclaimer, the term of this patent is extended or adjusted under 35 U.S.C. 154(b) by 0 days.

(21) Appl. No.: 09/848,561

(22) Filed: May 3, 2001

(65) Prior Publication Data

US 2002/0020144 A1 Feb. 21, 2002

Related U.S. Application Data

(63) Continuation of application No. 09/138,159, filed on Aug. 21, 1998, now abandoned, which is a continuation of application No. 08/966,305, filed on Nov. 7, 1997, now abandoned, and a continuation of application No. 08/964,572, filed on Nov. 5, 1997, now Pat. No. 6,412,252.
(60) Provisional application No. 60/031,048, filed on Nov. 15, 1996, provisional application No. 60/030,488, filed on Nov. 15, 1996, and provisional application No. 60/058,312, filed on Sep. 9, 1997.

(51) Int. Cl.$^7$ .............................. B65B 51/10; H05B 6/10
(52) U.S. Cl. .................... 53/329.2; 53/DIG. 2; 219/633
(58) Field of Search ................ 53/329–329.5, 53/DIG. 2; 219/632, 633

(56) References Cited

U.S. PATENT DOCUMENTS

| 3,477,197 A | 11/1969 | Budz |
| 3,748,422 A | 7/1973 | Schäfer |
| 3,763,342 A | 10/1973 | Oppenheimer |
| 3,946,349 A | 3/1976 | Haldeman, III |
| 4,017,704 A | 4/1977 | Collins, III et al. |
| 4,095,390 A | 6/1978 | Knudsen |
| 4,114,009 A | 9/1978 | Kiuchi et al. |
| 4,122,321 A | 10/1978 | Cachat |
| 4,213,830 A | 7/1980 | Koppl |
| 4,237,360 A | 12/1980 | Pohlenz |
| 4,380,484 A | 4/1983 | Repik et al. |
| 4,488,668 A | 12/1984 | Flaska et al. |
| 4,506,131 A | 3/1985 | Boehm et al. |
| 4,516,104 A | 5/1985 | McDermott |
| 4,707,213 A | 11/1987 | Mohr et al. |
| 4,757,175 A | 7/1988 | Mohr et al. |
| 4,819,414 A | 4/1989 | Worden et al. |
| 4,825,625 A | 5/1989 | Hufford |
| 4,845,332 A | 7/1989 | Jancosek et al. |
| 4,853,510 A | 8/1989 | Mohr et al. |

(List continued on next page.)

FOREIGN PATENT DOCUMENTS

| DE | 4213830 | 11/1993 |
| EP | 0408230 | 1/1991 |
| WO | 97/22523 | 6/1997 |

OTHER PUBLICATIONS

Product Brochure, Lepel Cap Sealing, Product Selection Guide. No publication date available.
Product Brochure, Pillar Foiler Capsealing System, Pillar Technologies Ltd. Partnership. No publication date available.
"Coil Design Holds Key To Improving Induction Cap Sealing Efficiency," Ronald F. May, Journal of Packaging Technology Jan./Feb. 1991.

Primary Examiner—Stephen F. Gerrity
(74) Attorney, Agent, or Firm—Ostrolenk, Faber, Gerb & Soffen, LLP

(57) ABSTRACT

An sealing system includes a frame, a ferrite core disposed within the frame, and a litz wire coil disposed proximate to the ferrite core for producing an electromagnetic field within the ferrite core, where the ferrite core and litz wire coil are adapted to direct the electromagnetic field toward a foil to seal an opening of a container with the foil. The sealing head is air cooled within the induction sealing unit.

48 Claims, 23 Drawing Sheets

U.S. PATENT DOCUMENTS

| | | | | |
|---|---|---|---|---|
| 4,891,484 | A | 1/1990 | Waggott et al. | |
| 4,899,025 | A | 2/1990 | Kamp et al. | |
| 5,022,531 | A | 6/1991 | Horino et al. | |
| 5,034,586 | A | 7/1991 | Havas et al. | |
| 5,059,762 | A | 10/1991 | Simcock | |
| 5,101,086 | A | 3/1992 | Dion et al. | |
| 5,109,653 | A | 5/1992 | Kubis et al. | |
| 5,230,427 | A | 7/1993 | Betts et al. | |
| 5,321,934 | A | 6/1994 | Bech | |
| 5,349,167 | A | 9/1994 | Simcock | |
| 5,381,913 | A | 1/1995 | Peeters | |
| 5,397,877 | A | 3/1995 | Couffet et al. | |
| 5,430,273 | A | 7/1995 | Bogdanski et al. | |
| 5,444,220 | A * | 8/1995 | Hansen et al. | 219/633 |
| 5,444,963 | A | 8/1995 | Steingroever et al. | |
| 5,461,215 | A | 10/1995 | Haldeman | |
| 5,513,781 | A | 5/1996 | Ullrich et al. | |
| 5,523,546 | A | 6/1996 | Lake | |
| 5,822,669 | A | 10/1998 | Okabayashi et al. | |
| 5,847,370 | A * | 12/1998 | Sluka et al. | 219/635 |
| 5,848,319 | A | 12/1998 | Morigami et al. | |
| 6,035,607 | A | 3/2000 | Miller | |
| 6,043,471 | A | 3/2000 | Wiseman et al. | |
| 6,078,033 | A | 6/2000 | Bowers et al. | |
| 6,092,643 | A * | 7/2000 | Herzog | 198/444 |
| 6,153,864 | A * | 11/2000 | Hammen et al. | 219/632 |
| 6,412,252 | B1 * | 7/2002 | Sarles et al. | 53/329.2 |
| 2001/0032839 | A1 * | 10/2001 | Herzog | 219/633 |

* cited by examiner

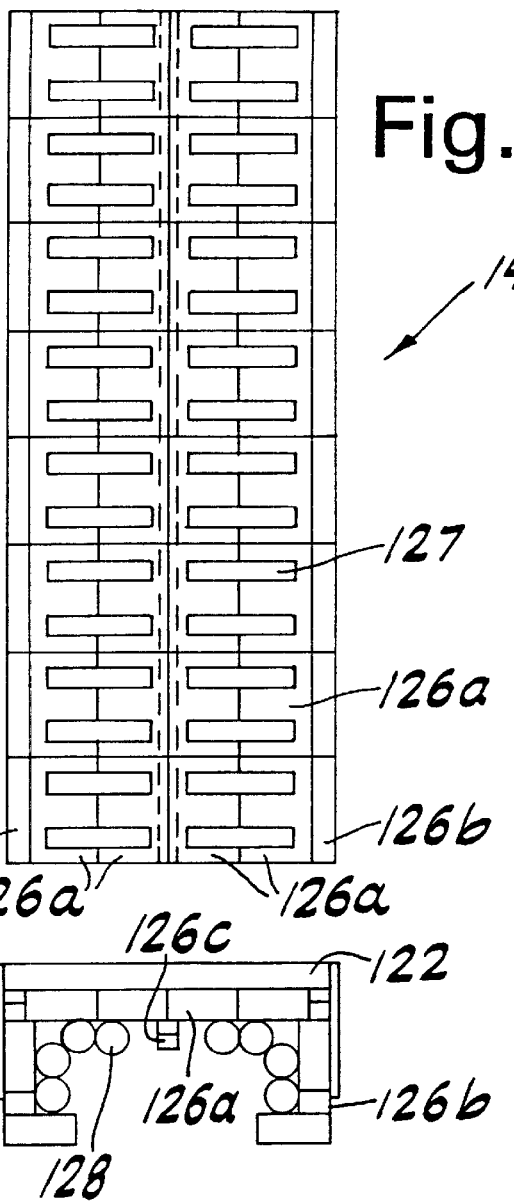
Fig. 5b
Fig. 5a
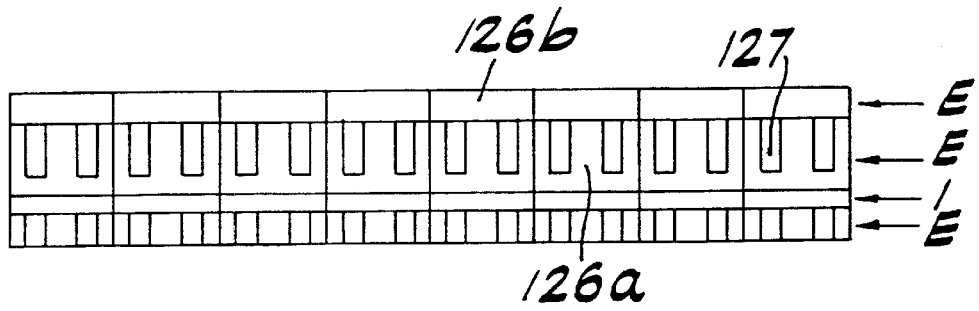
Fig. 5c

VERSION I

VERSION II

INDUCTION FOIL CAP SEALER EMPLOYING LITZ WIRE COIL

CROSS-REFERENCE TO RELATED APPLICATIONS

This application is based on and claims priority to:
(1) U.S. patent application Ser. No. 09/138,159, filed Aug. 21, 1998, entitled INDUCTION FOIL CAP SEALER, (abandoned) which is a continuation of U.S. patent application Ser. No. 08/966,305, filed Nov. 7, 1997, entitled INDUCTION FOIL CAP SEALER, now abandoned, which is a continuation of U.S. Provisional Application No. 60/031,048, filed Nov. 15, 1996, entitled INDUCTION FOIL CAP SEALER, and U.S. Provisional Application No. 60/030,488, filed Nov. 15, 1996, entitled INDUCTION FOIL CAP SEALER; and
(2) U.S. patent application Ser. No. 08/964,572, filed Nov. 5, 1997, entitled SLOTTED INDUCTION SEALER, (U.S. Pat. No. 6,412,252) which is a continuation of U.S. Provisional Application No. 60/058,312, filed Sep. 9, 1997, entitled INDUCTION FOIL CAP SEALER, U.S. Provisional Application No. 60/031,048, filed Nov. 15, 1996, entitled INDUCTION FOIL CAP SEALER, and U.S. Provisional Application No. 60/030,488, filed Nov. 15, 1996, entitled INDUCTION FOIL CAP SEALER;
the contents of all of which are incorporated herein by reference.

BACKGROUND OF THE INVENTION

1. Field of the Invention

The present invention relates to an induction sealing apparatus which seals a foil sheet or liner to the opening of a container and more particularly to an induction sealing apparatus which is air cooled.

2. Related Art

Induction sealing units for sealing, hermetically sealing or tamper-proof sealing a container with a foil liner are typically included in conveyor systems for high volume applications. These systems usually have flat or tunnel sealing heads mounted above a conveyor, which conveyor carries a plurality of containers to be sealed into proximity with the sealing head.

The containers to be sealed are preconditioned to include a foil liner disposed over the opening of the container. Usually, the foil liner is held in place by a screw-on or snap-on cap as is known in the art. Sometimes a wax compound and a paperboard portion are included above the foil liner.

Once the preconditioned container is brought within a predetermined distance from the sealing head, a coil within the sealing head produces an electromagnetic field near the foil liner which is disposed within the cap. The electromagnetic flux produced by the field causes current to flow in the foil liner which causes the foil liner to heat and melt the lip of the container (and wax compound if used). The molten plastic adheres the foil liner to the opening of the container and, when the plastic cools, a seal is produced. The downward force supplied by the cap ensures a proper bond between the foil liner and the opening of the container, particularly when the molten plastic is cooling.

Typically, power supplies which include solid state switching circuits generate high frequency currents for delivery to the coil within the sealing head to produce the requisite electromagnetic field for heating the foil liner. In addition, the coil in the sealing head is disposed around dense ferrite materials to channel the electromagnetic field and direct the field flux towards the foil liner for improved performance. Generally, the power supplies deliver approximately 2 to 4 kilowatts of power to the sealing head in order to properly seal the container.

In conventional systems, high currents are produced in the coil of the sealing head and, due to the relatively high resistance of the coil, results in a drastic elevation of the temperature of the coil and any surrounding structures. Therefore, the induction sealing units of the prior art employ hollow copper tubing when forming the coil in the sealing head to permit cooling water to flow through the hollow copper tube coil and cool the sealing head.

Unfortunately, the water cooling systems which cool the sealing heads (via hollow copper tubing coils) are expensive, bulky and inefficient. Such water cooling systems require tubing, radiators, radiator fans, circulators, pumps and the like in order to adequately cool the system.

SUMMARY OF THE INVENTION

Accordingly, it is an object of the present invention to provide an induction sealing unit which does not require expensive and bulky water cooling systems.

Another object is to provide such an induction sealing head which includes an air cooled sealing head.

A further object of the present invention to provide an induction sealing head which is more energy efficient.

It is also an object to provide such an induction sealing head that is easy to use, manufacture and maintain.

It has been found that the above and other objects of the present invention are attained in a cap sealing unit having a frame; a ferrite core disposed within the frame; and a litz wire coil disposed proximate to the ferrite core for producing an electromagnetic field within the ferrite core. The ferrite core and litz wire coil are preferably adapted to direct the electromagnetic field toward a foil to seal an opening of a container with the foil.

The cap sealing unit may also include a heatsink coupled to the housing, where at least part of the ferrite core is bonded or operatively coupled to the heatsink for transferring heat thereto.

According to another aspect of the invention, the cap sealing unit includes a ferrite core; a litz wire coil having a resistance, the coil being disposed proximate to the ferrite core producing an inductance; a tuning capacitor operatively coupled in series with the coil forming a resonant circuit having a resonance frequency; and a power supply unit adapted to provide output current at an output frequency to the tuned circuit, the power supply unit including a control circuit adapted to control the output frequency to substantially match the resonance frequency of the resonant circuit.

Other features and advantages of the present invention will become apparent from the following description of the invention which refers to the accompanying drawings.

BRIEF DESCRIPTION OF THE DRAWING

For the purpose of illustrating the invention, there are shown in the drawing embodiments which are presently preferred, it being understood, however, that the invention is not limited to the precise arrangements and instrumentalities shown.

FIG. 2b is a side elevational view of the induction sealing unit of FIG. 2a;

FIG. 2c is a front elevational view of an alternative design of the induction sealing unit of FIG. 2a;

FIG. 2d is an elevational view of another alternative design of the induction sealing unit of FIG. 2a;

FIG. 5a is a side elevational view of the ferrite core arrangement of the sealing head of the present invention;

FIG. 5b shows a top view of the ferrite core arrangement of FIG. 5a;

FIG. 5c shows a side view of the ferrite core arrangement of FIG. 5a;

DETAILED DESCRIPTION OF PREFERRED EMBODIMENT

Figure 1:
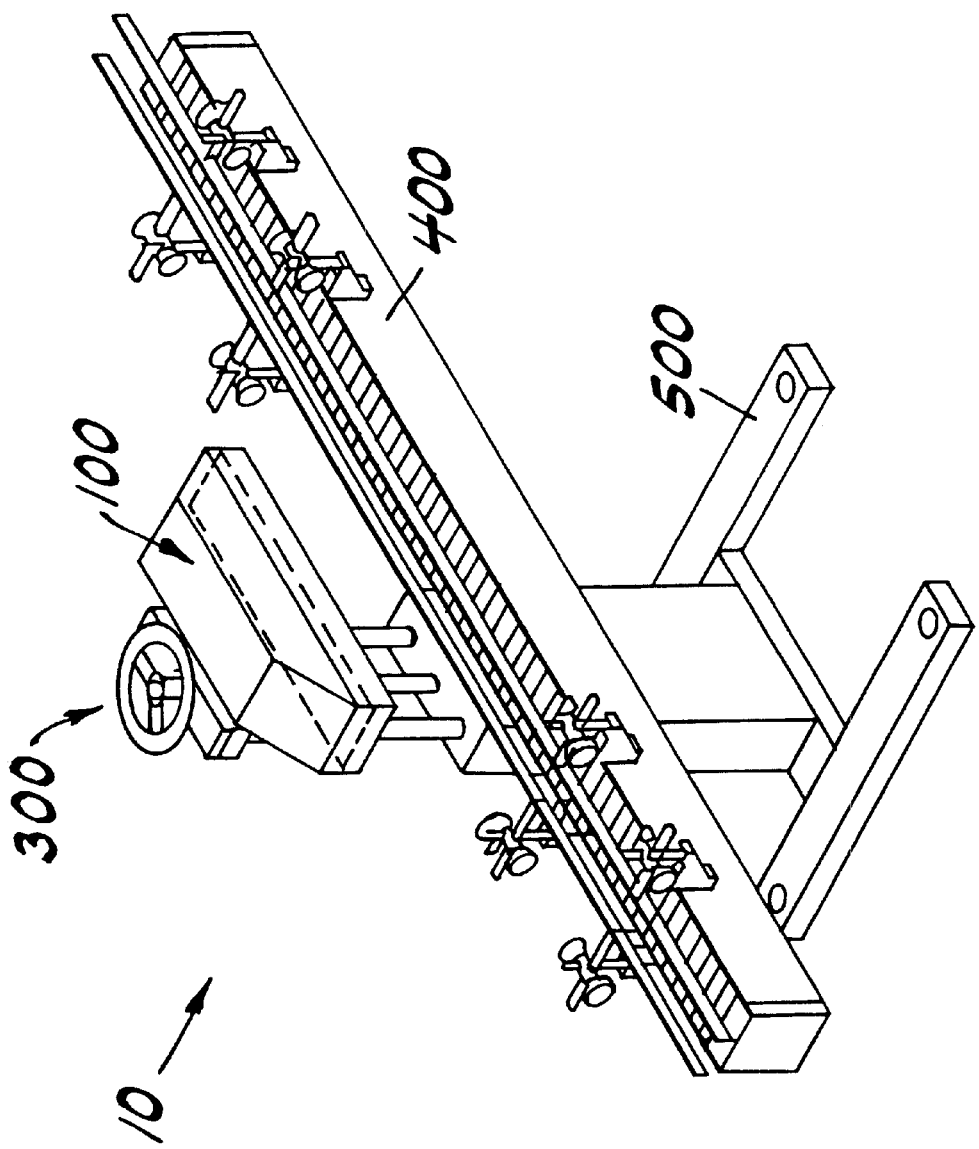
FIG. 1 shows a perspective view of an induction sealing conveyor system employing an air cooled sealing head in accordance with the present invention.

Referring now to the drawings wherein like numerals indicate like elements, there is shown in FIG. 1 an induction sealing conveyor system 10. The induction sealing conveyor system 10 includes an induction sealing unit 100, an adjustment mechanism 300, a conveyor 400, and a base 500. The adjustment mechanism 300 adjustably couples the induction sealing unit 100 to the base 500. Thus, the induction sealing unit 100 may be raised or lowered with respect to the base 500 and the conveyor 400 for insuring that the induction sealing unit is the proper distance from a container (not shown) to be sealed which travels down the conveyor 400. The adjustment mechanism 300 and the conveyor 400 are well-known in the art and any of the known adjustment mechanisms and conveyors can be used with the induction sealing unit 100 of the present invention.

Figure 2A:
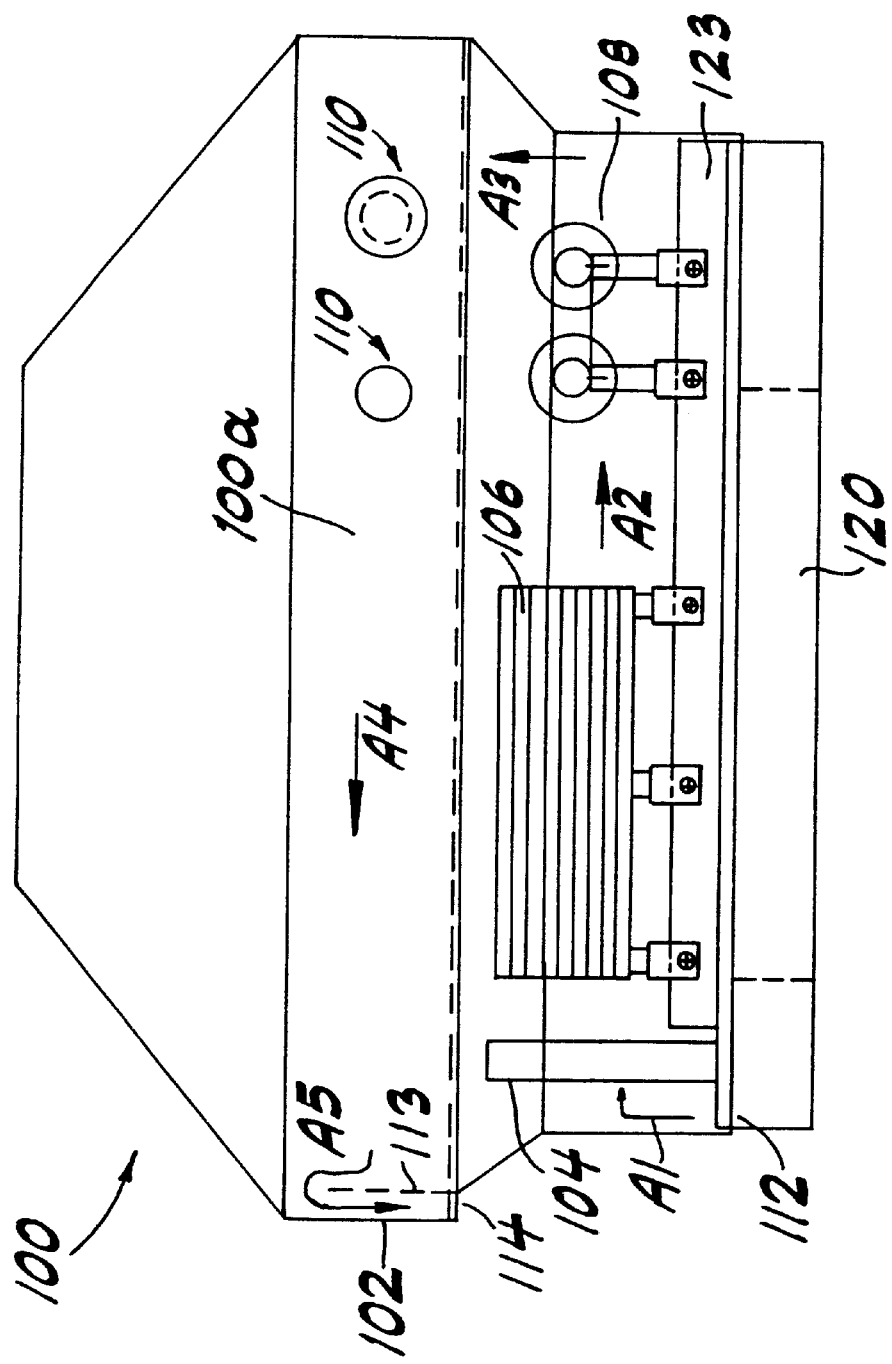
FIG. 2a is a front elevational view of an induction sealing unit employing the air cooled sealing head of the present invention.

With reference to FIG. 2a, the induction sealing unit comprises a housing 102 and start and stop switches 110 disposed on the housing 102 for activating and deactivating the induction sealing unit 100. The components within the housing 102 include a fan 104, a capacitor 106, a transformer 108, a sealing head 120 and a power supply (not shown), the operation of which will be described below. The sealing head 120 extends from the bottom of the housing 102.

Figure 3G:
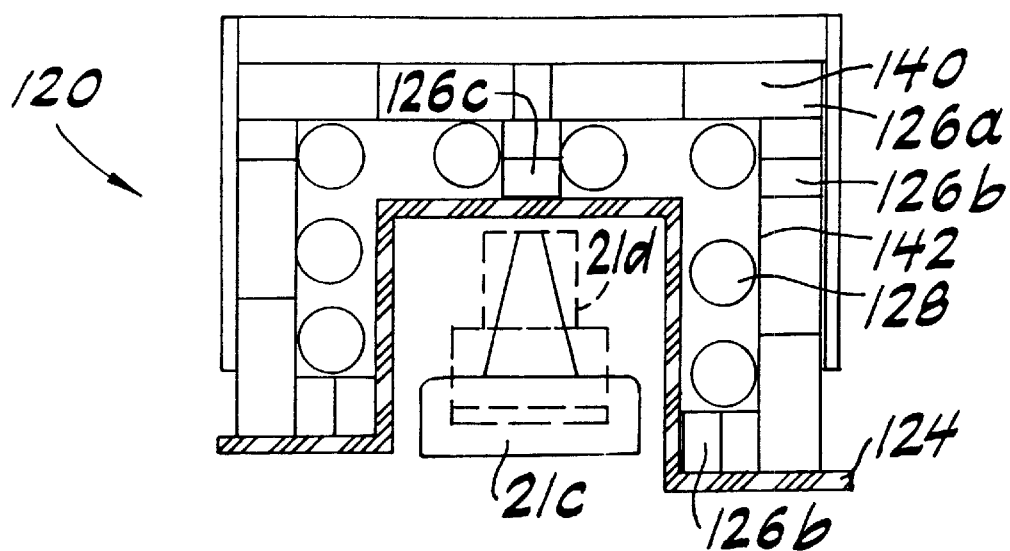
FIGS. 3a–3g are side elevational views of alternative embodiments of the sealing head of FIG. 3.
Figure 2B:
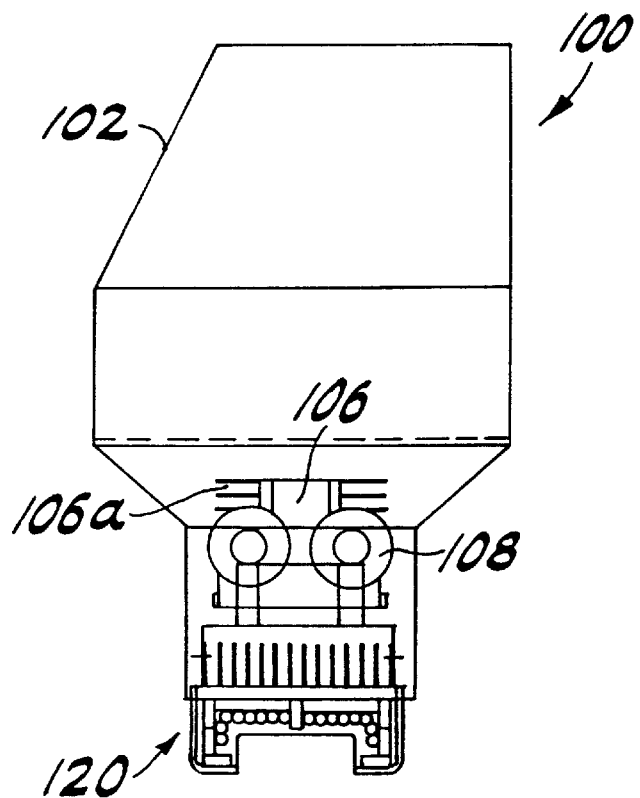
Figure 3:
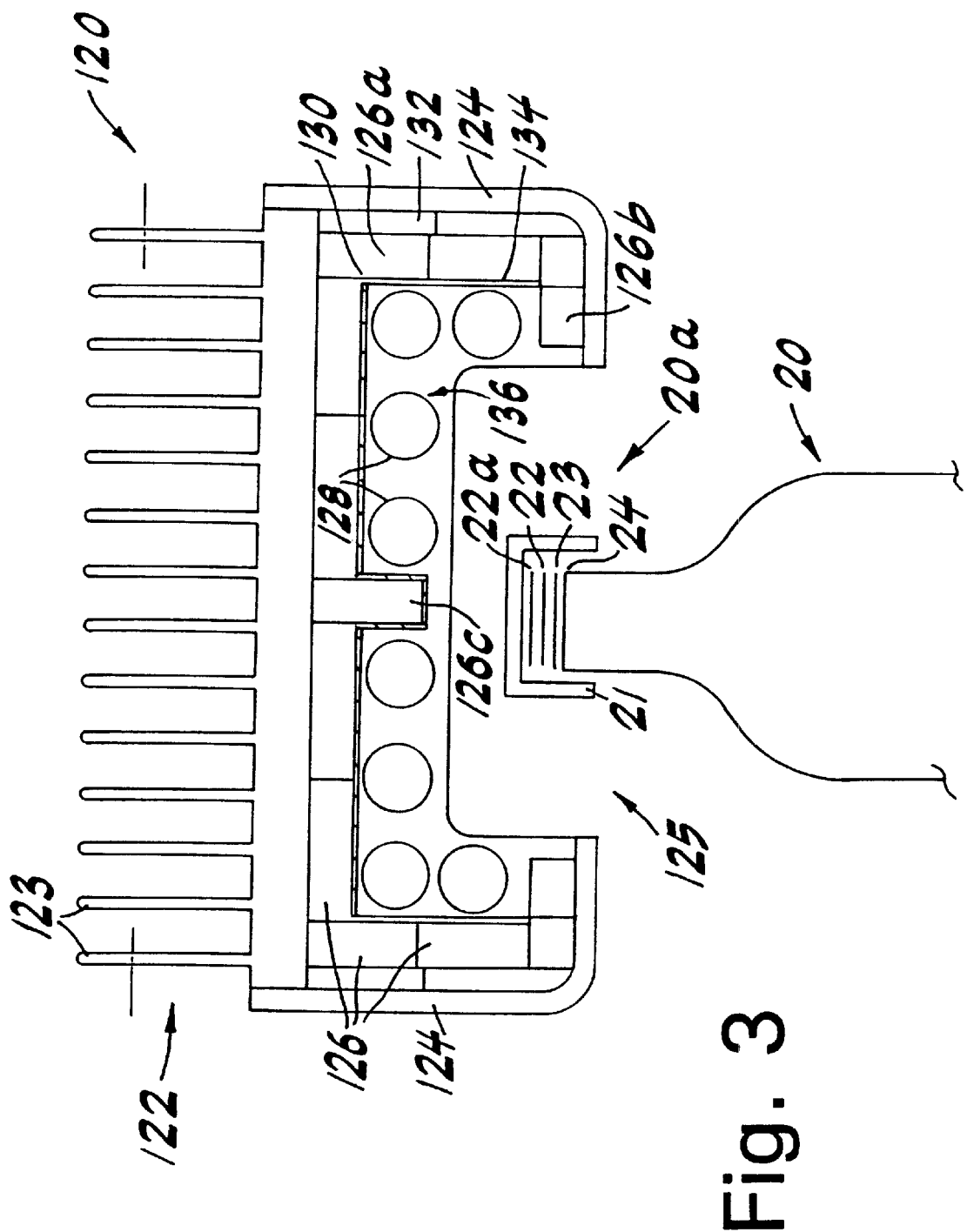
FIG. 3 is a side elevational view of an embodiment of the sealing head of the present invention.

FIG. 2b shows a side elevational view of the sealing head 120 extending from the bottom of the housing 102 and FIG. 3 shows an enlarged view of the same. It is noted that the capacitor 106 preferably includes a heatsink 106a having fins for air cooling the capacitor 106.

With reference to FIG. 3, the sealing head 120 is adapted to receive at least a portion of a container 20, preferably a top portion 20a. As shown, the top portion 20a includes a lip 24 forming an opening in the container 20, a foil liner 23, a wax compound 22, a paperboard portion 22a, and a cap 21. It is preferred, however, that the top portion of the container 20a only include the lip 24 and the foil liner 23 disposed in the cap 21.

The induction sealing unit 100 seals the container 20 by sealing the foil liner 23 to the lip 24 of the container. In use, the cap 21 including the foil liner 23 is screwed on the container 20 or attached to the container 20 by any of the known methods. The top portion 20a of the container 20 is then brought into proximity with the sealing head 120, preferably within a recessed portion 125 of the sealing head 120 such that an electromagnetic flux 148 (FIG. 4b) produced by the sealing head 120 is directed toward the top portion 20a.

When the electromagnetic flux passes through the foil liner 23, a current is produced in the foil liner 23 causing it to heat. The heating of the foil liner 23 causes the plastic material of the container lip 24 to heat and melt such that the container lip 24 fuses with the foil liner 23. When the plastic material of the container lip 24 cools, the container 20 is sealed, for example, leak proof sealed, hermetically sealed, tamper evident sealed, or tamper-proof sealed, whichever is preferred. The container 20 can be hermetically sealed by any of the known methods. If the wax compound 22 and paperboard portion 22a are used, the wax compound 22 also heats and melts in response to the heated foil liner 23, thereby releasing the foil liner 23 from the paperboard portion 22a.

The sealing head 120 includes a coil heatsink 122 having fins 123 extending upwards and away from heat generating portions of the sealing head 120 which will be described in more detail below. Further, the sealing head 120 includes a frame 124, preferably plastic, coupled to the heatsink 122.

Disposed within the frame 124 are a ferrite core 126 (preferably formed of individual cores 126a, 126b, 126c) and a litz wire coil 128 disposed adjacent to the ferrite core 126. As will be described in more detail below, the litz wire coil 128 is disposed around or proximate to the ferrite core 126 to channel the electromagnetic field and direct the field flux 148 (FIG. 4b) towards the foil liner 23 for proper performance. The litz wire 128 is coiled around the ferrite core 126 such that the electromagnetic field developed around the litz wire 128 is channeled into the ferrite core 126.

Shims 132, preferably aluminum, may be disposed between the ferrite core 126 and the frame 124 to properly position the ferrite core 126 within the frame. The ferrite core 126 is operatively coupled to the underside of the coil heatsink 122 and may be operatively coupled to the shims 132 (if used).

Sealing tape 130 may be disposed at the corners of the ferrite core 126 in order to prevent seepage of a potting compound 136 described below. Further, an electrically insulating and thermally conductive pad 134 may be disposed on the surface of the ferrite core 126 to electrically insulate the litz wire 128 from the ferrite core 126.

Preferably, the litz wire 128 includes thousands of individually insulated electrical conductors surrounded by an insulating sheath (not shown), made from polyethylene, polypropylene, Teflon™, (i.e., polytetrafluoroethylene—PTFE), or the like, which also electrically insulates the litz wire 128 from surrounding structures, including the ferrite core 126. Therefore, it is preferred that the sealing head 120 does not include the electrically insulating pad 134 in favor of the insulating sheathing directly on the litz wire 128.

A potting compound 136 is introduced into the area of the sealing head 120 defined by the frame 124, the ferrite core 126 and the litz wire coil 128 to lock the elements together and rigidly maintain the form of the structure.

Figure 3A:
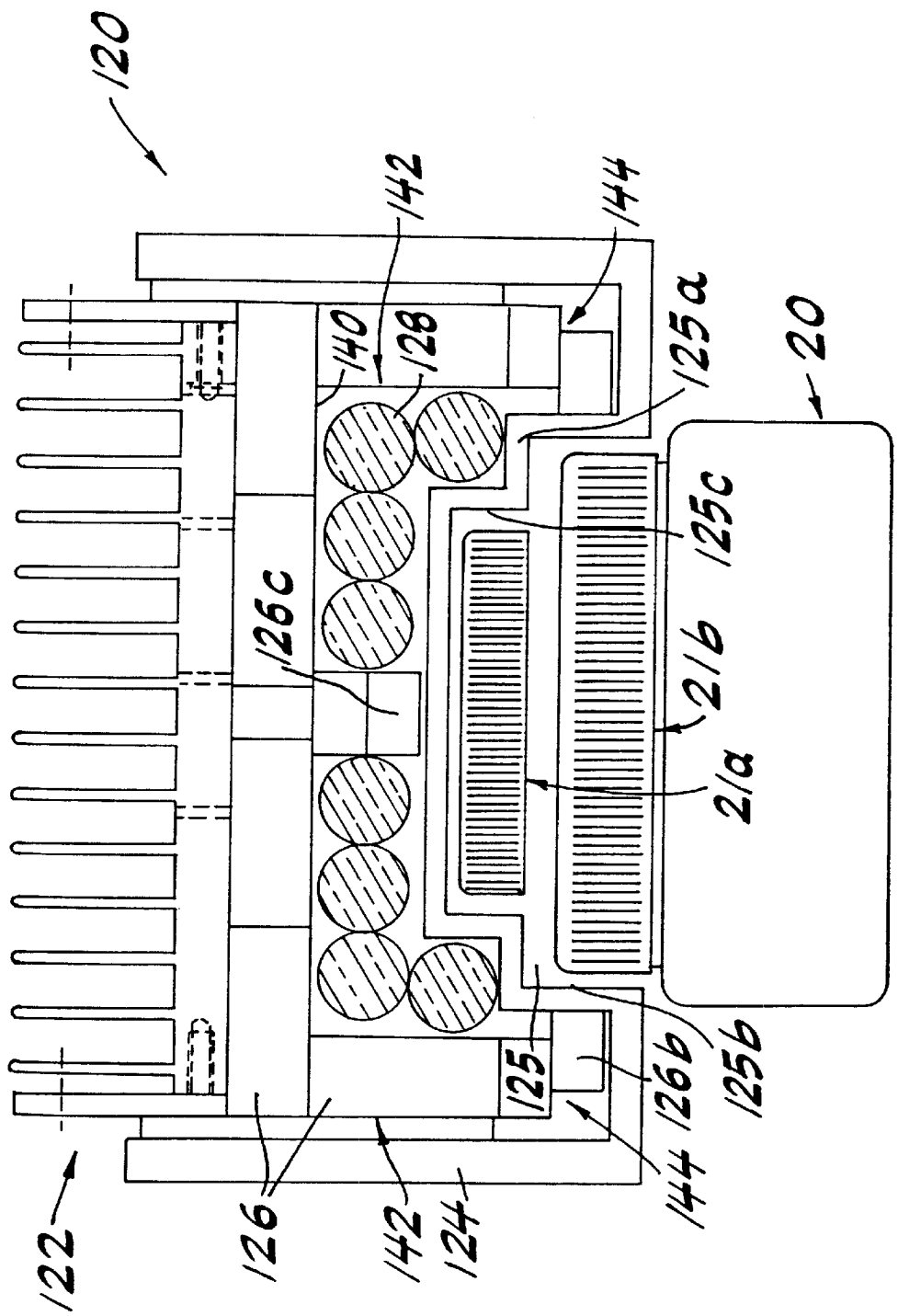

Reference is now made to FIG. 3a which shows a cross-sectional view of an alternative embodiment of the sealing head 120 of the present invention. The sealing head of FIG. 3a is adapted to receive containers 20 having different sized caps 21a, 21b.

In particular, the sealing head 120 includes a stepped portion 125a within the recess 125. The stepped portion 125a includes a first lower opening portion 125b and a second upper opening portion 125c where the first opening portion 125b is larger than the second opening portion 125c. Containers 20 having larger caps 21b may be placed within the first opening portion 125b and containers 20 having smaller caps 21a may be placed within the second opening portion 125c. Thus, the cap 21 may be received in the recess of the sealing head 120 and be subject to an optimal amount of electromagnetic flux, irrespective of the size of the cap 21.

As shown in FIGS. 3 and 3a, the ferrite core 126 is adapted to provide a tunnel or a U-shaped recess 125 to receive the container 20. In particular, the ferrite core 126 provides a substantially horizontally directed portion 140, two oppositely disposed and substantially vertically directed portions 142 extending from respective edges of the horizontal portion 140, and a center spine portion 126c extending substantially vertically from the horizontal portion 140 but between the oppositely disposed vertical portions 142.

It has been found that containers 20 having smaller caps 21a receive an improved amount of flux when permitted to move into the second opening portion and attain closer proximity to the center spine portion 126c.

It has also been found that employing inwardly directed cores 126b (FIG. 3a) from the lower edges 144 of the oppositely disposed vertical portions 142 direct the flux toward the container 20 in such a way as to improve the heating of the foil liner 23.

Figure 3B:
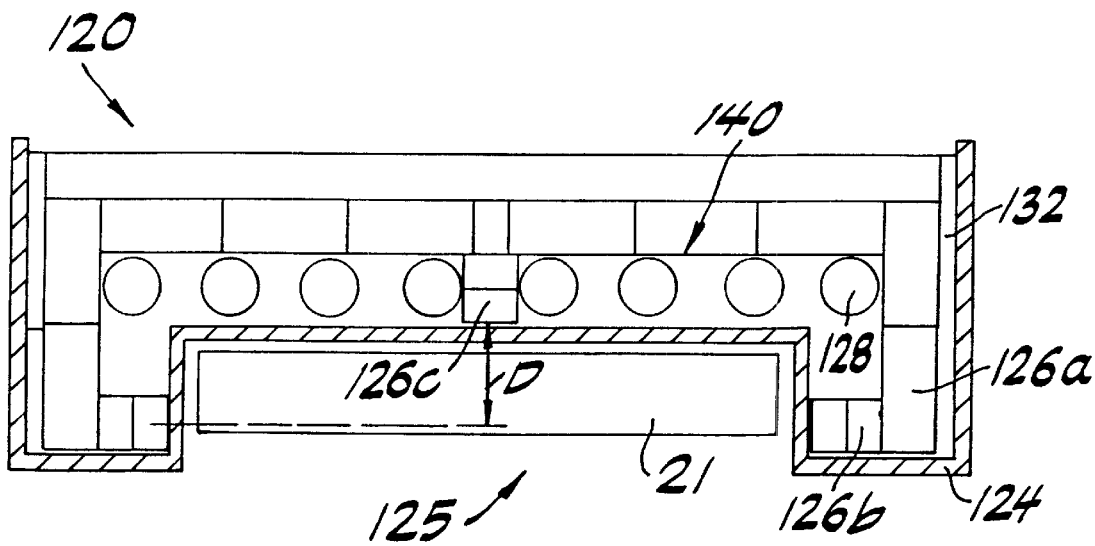
Figure 3C:
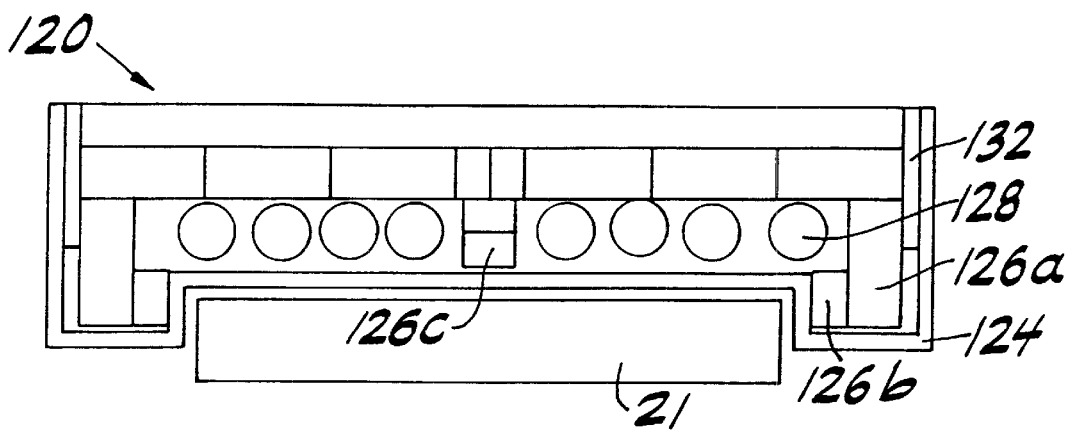
Figure 3D:
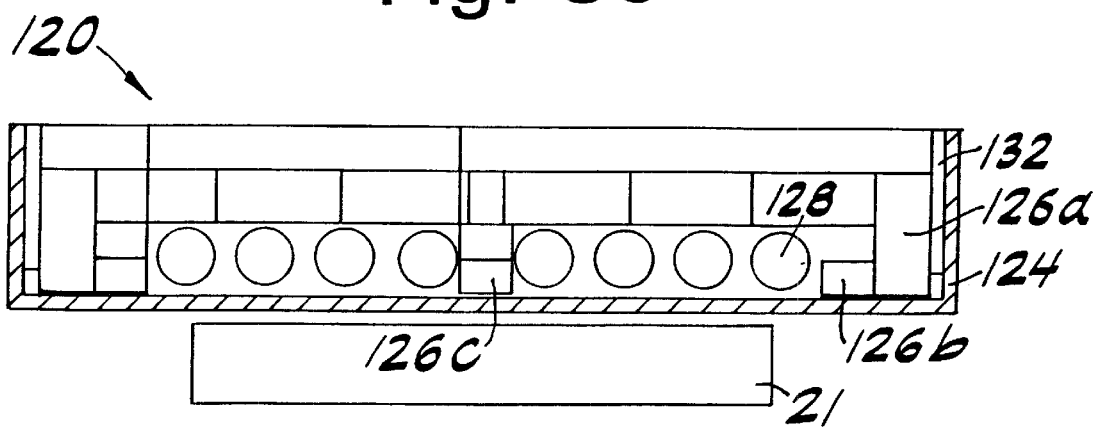

Reference is now made to FIGS. 3b–3d which show alternative embodiments of the sealing head 120 of the present invention. The sealing heads 120 of FIGS. 3b–3d are adapted to receive containers 20 having relatively wide caps 21, as wide as about 120 mm or more. These wide caps 21 also include relatively wide foil liners 23 (not shown). It has been found that wider foil liners 23 heat more effectively when the vertical distance D from the center spine portion 126c to the inwardly directed portions 126b is relatively small. When the vertical distance D is small, the flux lines of the field are relatively shallow and substantially horizontally directed toward the foil liner 23. Thus, relatively shallow flux lines are attained by arranging the ferrite core 126 to form a wider and shorter cross-sectional sealing head 120.

Consequently, the litz wire coil 128 of the sealing head 120 of FIG. 3b is arranged to be flat against the upper portion 140 of the ferrite core 126 and the U-shaped recess 125 for receiving the cap 21 is shallower. FIGS. 3c and 3d show ferrite core 126 designs having even smaller vertical distances D, where, in the design of FIG. 3d, the distance D is close or equal to zero and, therefore, the sealing head 120 does not include a U-shaped recess at all.

Figure 3E:
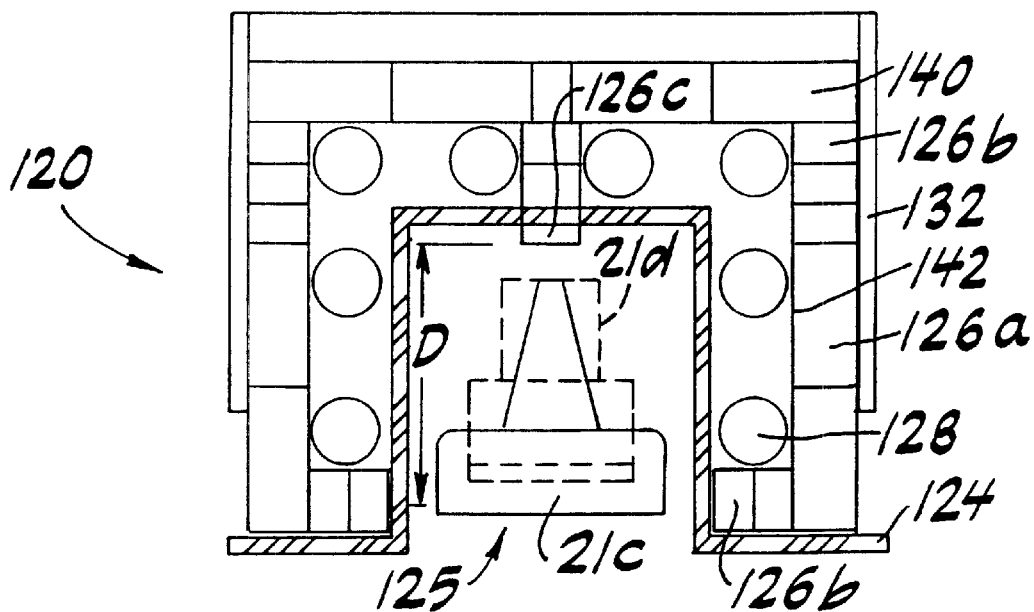
Figure 3F:
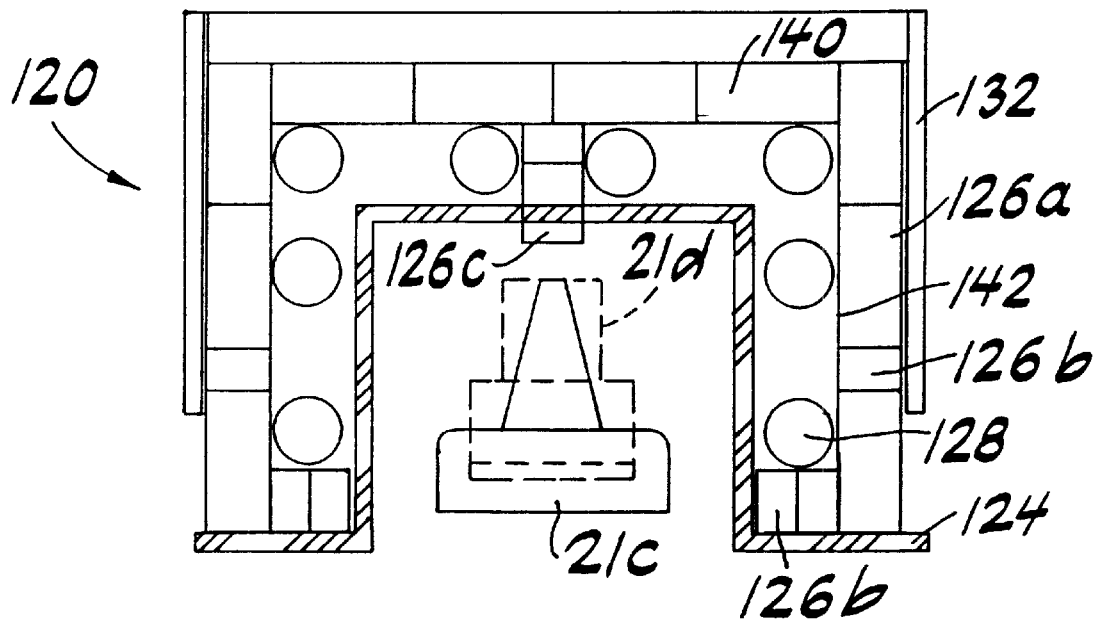

Reference is now made to FIGS. 3e–3g which show further alternative embodiments of the sealing head 120 of the present invention. The sealing heads 120 of FIGS. 3e–3g are adapted to receive containers 20 having relatively narrow and tall caps 21, such as "mustard" caps 21c for use on mustard containers, pull-open caps 21d (for use on water bottles, sports bottles, or the like) or other types of relatively tall and narrow caps 21. These narrow caps 21 also include relatively narrow foil liners 23 (not shown). It has been found that narrow foil liners 23 heat more effectively when the vertical distance D from the center spine portion 126c to the inwardly directed portion 126b is relatively large. When the vertical distance D is relatively large, the flux lines of the field are relatively deep and substantially vertically directed in relation to the cap. This orientation of the flux lines has been formed to more effectively couple to the foil liner 23. Thus, relatively deep and substantially vertically directed flux lines are attained by arranging the ferrite core 126 to form a taller and narrower cross-sectional sealing head 120.

Consequently, the litz wire coils 128 of the sealing heads 120 of FIGS. 3e–3g are arranged to be spaced substantially downwardly from the upper portion 140 of the ferrite core 126 and against the vertically directed portions 142 of the ferrite core 126. Thus, the U-shaped recess 125 for receiving the cap 21 is substantially deeper.

FIG. 5a shows a preferred construction for the ferrite core 126 in accordance with the invention, although it should be realized that any ferrite core arrangement can be utilized just so long as it directs the electromagnetic field toward the foil liner 23 to heat the foil liner 23. It is preferred that the ferrite core 126 be constructed from both "E" cores 126a and "I" cores 126b where the cores 126a, 126b are alternated and abutted to produce the final shape of the ferrite core 126, although all "E" cores 126a or all "I" cores 126b can also be used. In the preferred embodiment of the present invention, about fifty-six (56) "I" cores 126b and about forty-eight (48) "E" cores 126a are employed to produce the ferrite core 126. The "E" and "I" cores can be obtained from any of the known suppliers.

As shown in FIG. 5b, a top view of a first layer of cores 126a, 126b of the ferrite core 126 (i.e., the upper portion 140 of the ferrite core 126) reveals the specific arrangement of "E" cores and "I" cores. The arrangement from left to right in the figure is as follows: an "I" core 126b, two oppositely disposed and abutting "E" cores 126a, two more oppositely disposed and abutting "E" cores 126a, followed by an "I" core 126b. FIG. 5c shows a side view of the ferrite core 126 where, from top to bottom, alternating "I" cores 126b and "E" cores 126a are arranged to form the ferrite core 126. As is best seen in FIG. 5a, "I" cores are disposed on the upper portion 140 of the ferrite core 126 to form the center spine portion 126c.

With reference to FIGS. 3–3g and in light of the above teaching, it is noted that the arrangement of "I" and "E" cores 126a, 126b may be adjusted by those skilled in the art to achieve a desired form of the ferrite core 126. It is also noted that FIG. 5a shows yet another contemplated configuration of the litz wire 128.

Reference is again made to the specific orientation of the "E" cores of FIGS. 5b and 5c. As shown, slots 127 are formed in the ferrite core 126 as a result of the oppositely abutting arrangement of the "E" cores 126a. One important feature of the slots 127 is that they provide an enlarged aggregate surface area from which to remove heat from the ferrite core 126. Indeed, ferrite material is not particularly conducive to conducting heat and the inclusion of slots 127 provides a useful means for removing heat from the ferrite material 126. It is noted that the "E" cores 126a are manufactured with the slots 127 therein; however, the particular arrangement of the slots 127 as shown in FIGS. 5b and 5c insures that the slots 127 form a "channel" which is directed to or towards the heatsink 122.

The slots 127 may be filled with a high aluminum content, thermally conductive material to provide a path for heat to be carried from the ferrite core 126, specifically the "E" cores 126a and "I" cores 126b, to the heatsink 122. It is most preferred that the slots 127 be filled with a ceramic material, such as Aremco CERAMACAST™ 510 powder (which is mixed with water and applied using the directions on the container thereof) or other suitable materials. The CERAMACAST™ 510 powder may be obtained from Aremco Products, Inc. or from any of the known suppliers.

Alternatively, the slots may be filled with a potting compound 136 which is suitable for both: (i) providing a thermally conductive medium through which heat is transferred from the surface area within the slots 127 of the ferrite core 126 to the heatsink 122; and (ii) locking the frame 124, the ferrite core 126 and the litz wire coil 128 of the sealing head 120 together to rigidly maintain the form of the structure.

Further, the slots 127 may be left substantially devoid of materials (i.e., filled with air) because the slots 127 would still communicate with the heatsink 122 and transfer heat thereto.

It is also noted that the slots 127 should be oriented in a direction which is parallel to the direction of propagation of the field flux within the ferrite core 126. This insures that the field flux within the ferrite core 126 is not unnecessarily impeded.

In the construction of the sealing head 120, it is preferred that the ferrite cores 126a, 126b are first bonded to a slab of heat conductive material, for example aluminum. The heat conductive material may be the heatsink 122 itself, however, it is most preferred that the ferrite cores 126a, 126b are first bonded to a separate aluminum slab (not shown) which is later mounted to the heatsink 122.

If the aluminum slab is used, a first layer of ferrite cores 126a, 126b (FIG. 5b) are bonded to the aluminum slab using an appropriate epoxy material, such as Aremco No. 568 two part epoxy (applied and cured as directed on the containers thereof) or other suitable materials. The Aremco No. 568 two part epoxy is aluminum filled for better ferrite-to-aluminum bonding.

Next, the ferrite core 126 is further assembled to include additional ferrite cores 126a, 126b which are bonded to the first layer of ferrite cores 126a, 126b (FIG. 5a). It is preferred that the ferrite-to-ferrite bond be accomplished using an epoxy material, such as Aremco No. 631 two part epoxy (applied as directed on the containers thereof) or other suitable materials. Thus, the basic shape of the ferrite core 126 as shown in FIG. 5a is achieved.

At this point in the assembly of the sealing head 120, the slots 127 of the ferrite core 126 are filled with the thermally conductive ceramic material as described above.

Figure 4A:
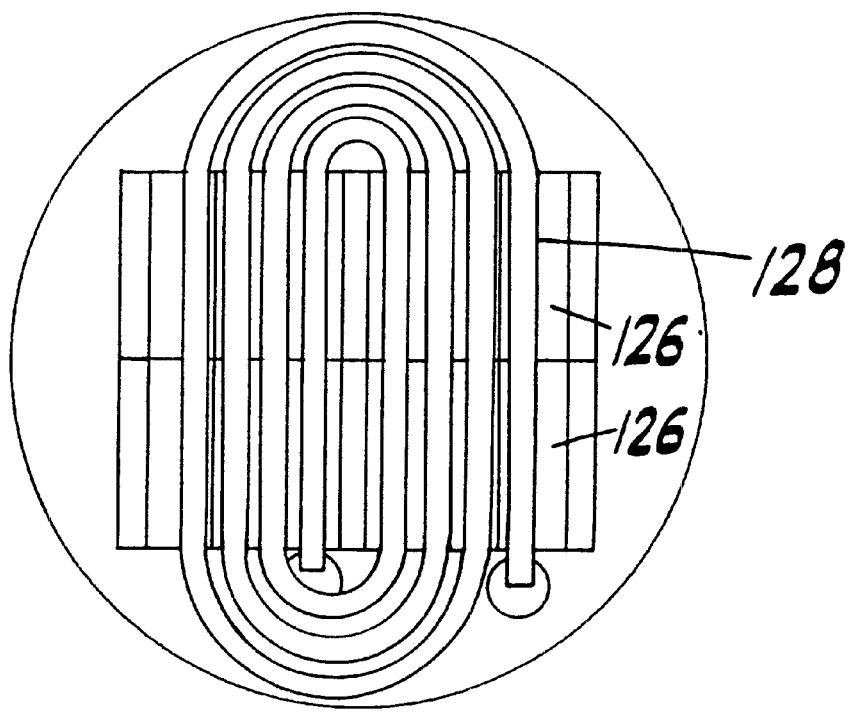
FIG. 4a is a bottom plan view of the coil and ferrite core of the sealing head of the present invention.

Next, the litz wire 128 is disposed adjacent the ferrite core 126 as shown in FIG. 4a, i.e., in a coiled arrangement. It is noted that, for a conveyor system 10 (FIG. 1), the ferrite core 126 may be more elongate than that shown in FIG. 4a; however, it is understood that the length of the ferrite core 126 may be readily sized by one skilled in the art. The litz wire 128 is preferably bonded to the ferrite core 126 using a suitable epoxy material, for example Aremco No. 526N two part epoxy (applied and cured as directed on the packages thereof) or other suitable materials.

As discussed above, sealing tape 130 (FIG. 3) may be disposed at the corners of the ferrite core 126 (in order to prevent seepage of a potting compound 136 described below) and an electrically insulating and thermally conductive pad 134 may be disposed on the surface of the ferrite core 126 (to electrically insulate the litz wire 128 from the ferrite core 126) prior to bonding the litz wire 128 to the ferrite core 126. As discussed above, however, it is preferred that the sealing tape 130 and pad 134 be omitted.

Figure 6A:
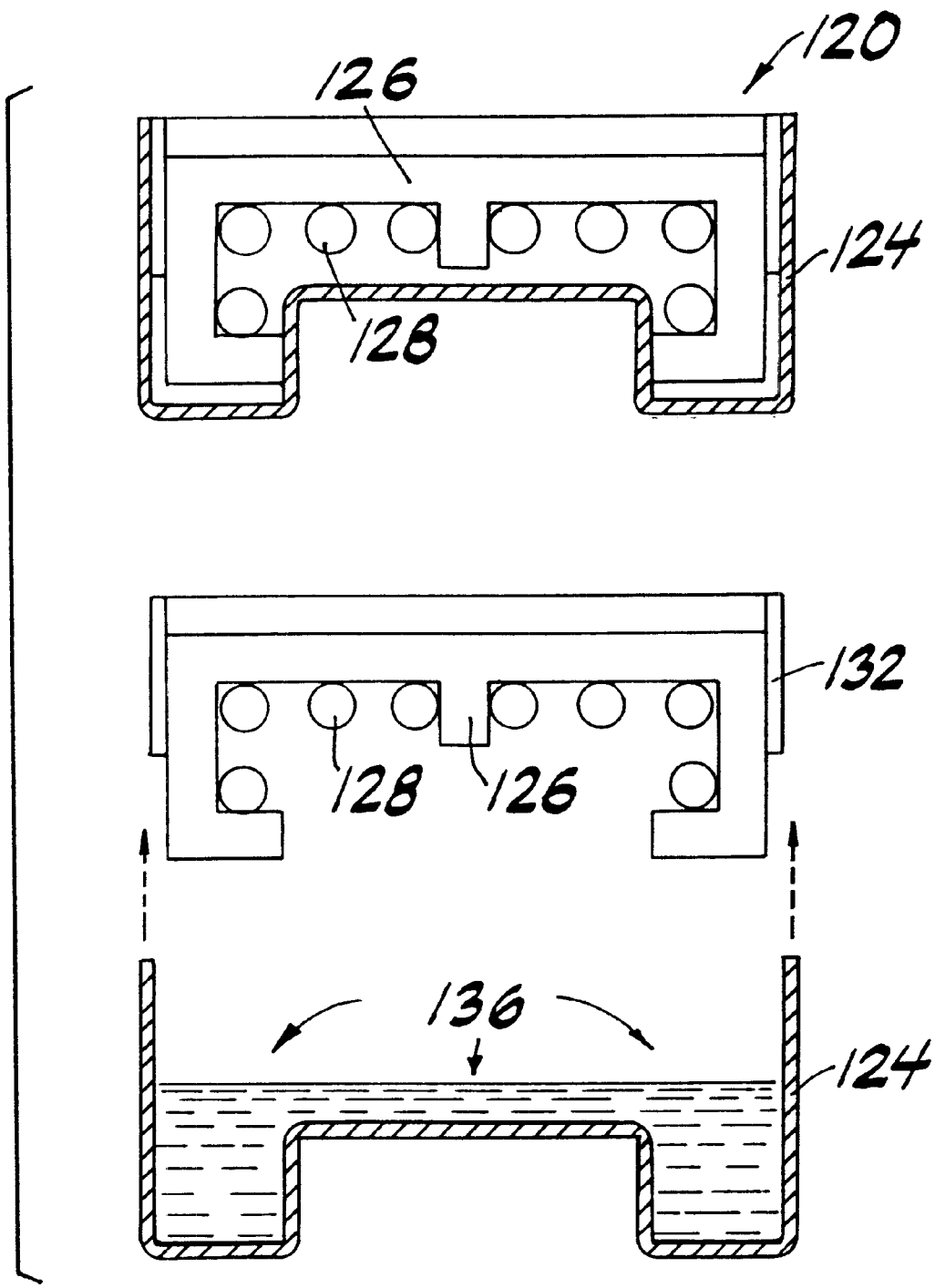
FIGS. 6a and 6b show exploded views of the sealing heads of FIGS. 3 and 3a, respectively.
Figure 6B:
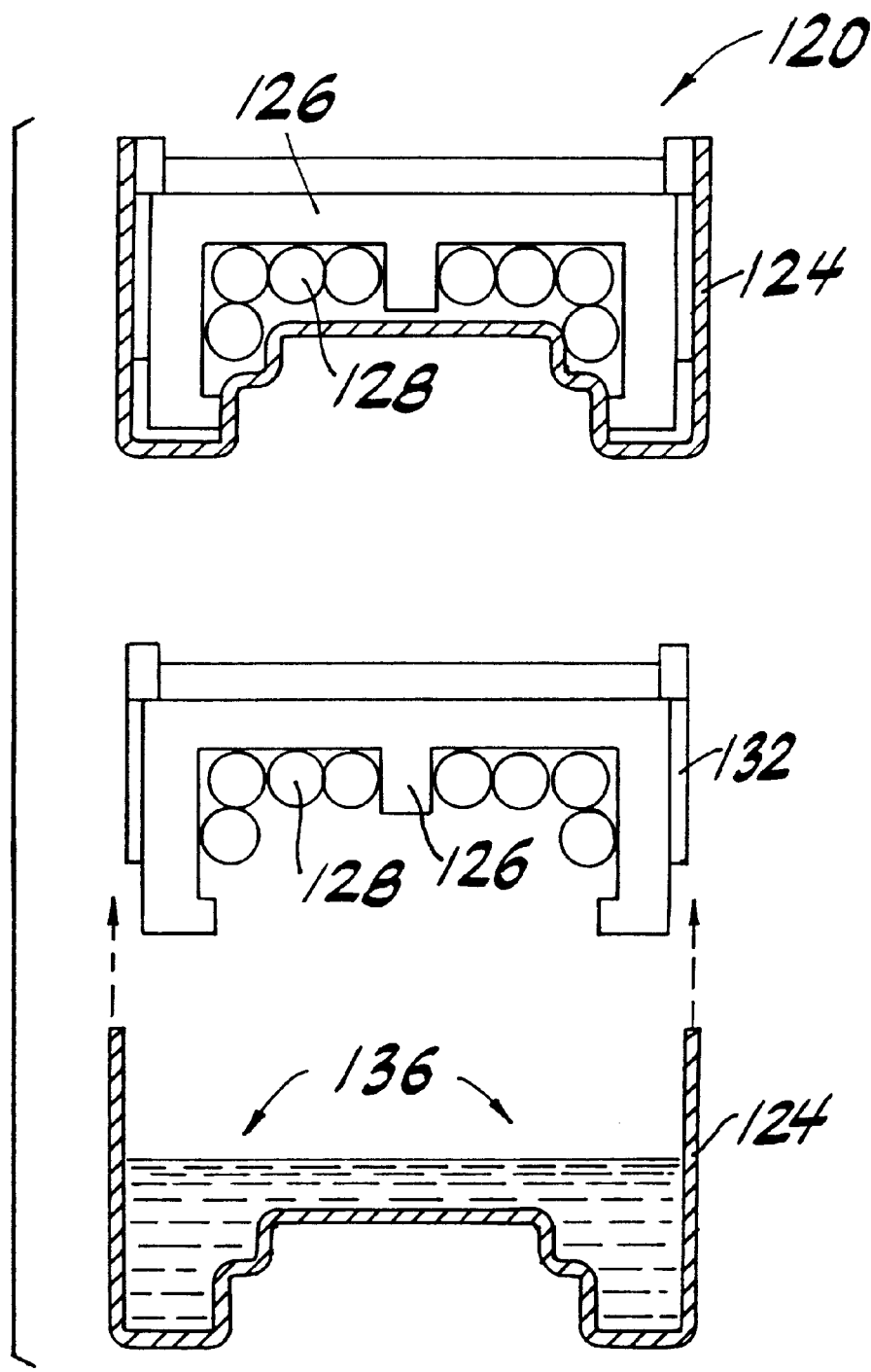

Next, the potting compound 136 is introduced into the area of the sealing head 120 defined by the frame 124, the ferrite core 126 and the litz wire coil 128 to lock the elements together and rigidly maintain the form of the structure. This is accomplished by any of the known methods, for example, by introducing a polyethylene mold into the area to define the outside surface contour of the potting compound 136 and then pouring the potting compound 136 into the area. With reference to FIGS. 6a and 6b, it is preferred that the frame 124 is first filled with the potting compound 136 and then the frame 124 is moved over the ferrite core 126 and litz wire 128 subassembly to form the completed sealing head unit 120.

Referring now to FIGS. 2a through 2d, a power supply 109 (shown in FIG. 2d), which includes solid state switching components and control circuitry, provides driving current to the sealing head 120. The capacitor 106 provides a source of capacitive reactance (C) for developing an LCR circuit with the resistance (R) and inductance (L) of the litz wire coil 128 and ferrite core 126. The transformer 108 properly matches the voltage and current sourced from the switching components of the power supply 109 to the LCR circuit.

The power supply 109 generates high frequency currents within the litz wire coil 128 of the sealing head 120 to produce an electromagnetic field of sufficient strength to cause the foil liner 23 of the container 20 to heat (FIG. 3). The power supply should deliver about 2 to 4 kilowatts of power to the sealing head 120 in order to properly seal the container 20.

The present invention may be driven by prior art power supplies (which include control electronics and solid state switching components). For example, the power supply from the 2KW COMPAK™ System Induction Seal Cap Sealer of Enercon Industries Corporation, Menomonee Falls, Wis., may be used to drive the sealing head 120 of the present invention, although some modifications may be necessary. When using the Enercon COMPAK™ System power supply, the sealing head 120 of the present invention may be driven using either the Enercon COMPAK™ System's capacitor and transformer or the capacitor 106 (preferably 1 uF) and the transformer 108 (preferably having a step down ratio of 6:1) of the present invention.

The present invention contemplates using power supplies which deliver substantially higher currents (preferably 4 times higher than the prior art power supplies) to the litz wire coil 128 because the litz wire coil 128 has superior current handling properties over the prior art water cooled coils. The specific advantages of using a litz wire coil 128 are discussed in more detail below.

It is noted that the series LCR circuit has a Q factor which is a function of the specific values of the inductance (L) of the litz wire coil 128 and ferrite core 126 combination, the capacitance (C) of capacitor 106 and the resistance (R) of the litz wire coil 128. The transfer function of the LCR circuit has a peak gain value at resonance which increases with increased Q. Since, in an LCR tuned circuit (as is present in the sealing head 120 of the preferred embodiment of the present invention) the Q factor is inversely proportional to R, the Q factor of the sealing head 120 is much higher than the Q factor of conventional sealing heads.

Consequently, there is very little margin for error in providing an alternating current having a proper frequency to the tuned LCR circuit. Indeed, as the frequency of the delivered current moves away from the resonance value of the LCR circuit, the gain of the LCR circuit is greatly reduced and the current falls below that which is necessary to produce desired heating of the foil liner 23. It is noted that the prior art sealing heads also have Q factors, however, such Q factors of the prior art are much lower than that of the preferred embodiment of the present invention.

Therefore, it is preferred that the electronics, specifically the control electronics of the power supply, contain circuitry which maintains the frequency of the delivered current to the sealing head 120 (specifically, the LCR circuit) at or near resonance.

Figure 7:
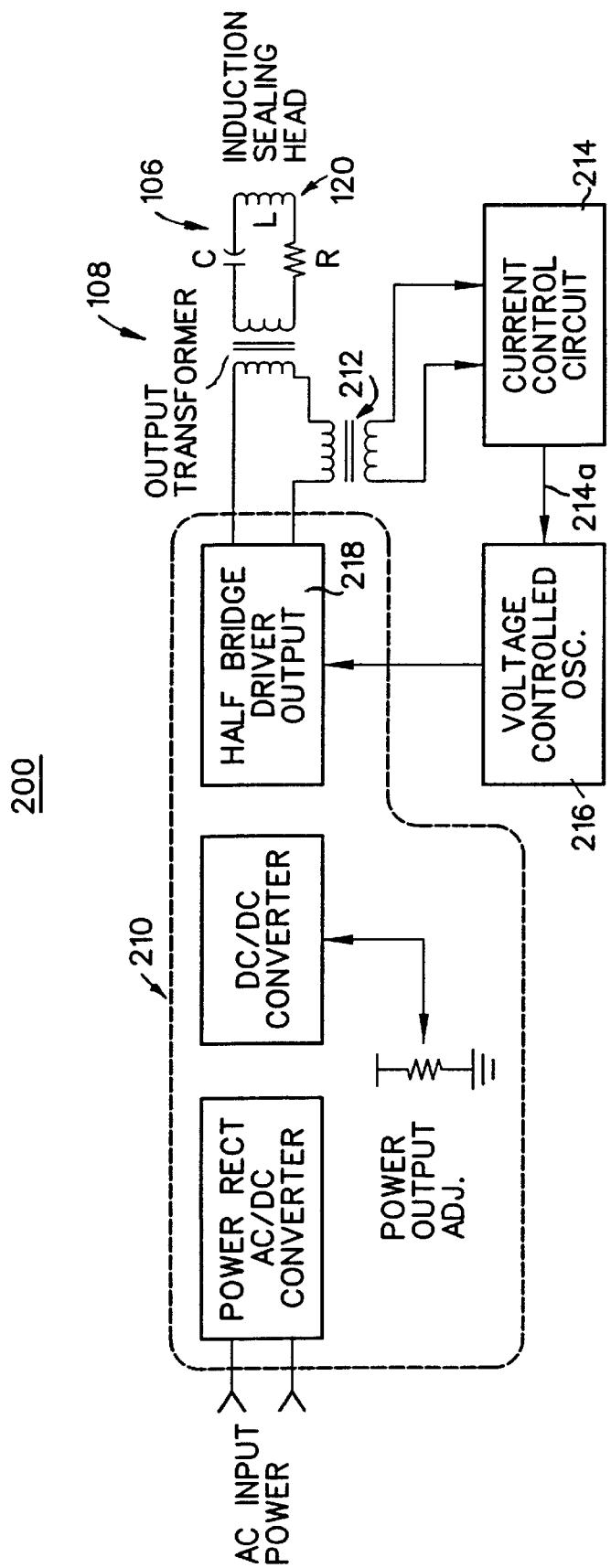
FIG. 7 shows a block diagram of a preferred power supply for driving the sealing head of the present invention.

Reference is now made to FIG. 7 which shows a block diagram of a preferred power supply 200 for driving the sealing head 120 of the present invention. The power supply 200 includes a power stage 210 (having the solid state semiconductor components therein, i.e., the half bridge driver 218) and control circuitry (having a current sense transformer 212, a current control circuit 214 and a voltage controlled oscillator (VCO) 216 therein).

The operation of the power supply 200 will now be described. The current in the primary of the transformer 108 is sensed by the current sense transformer 212 and is delivered to the current control circuit 214. Thus, the current control circuit 214 utilizes a signal which is indicative of the current which flows in the sealing head 120 (specifically, the tuned LCR circuit). The current control circuit 214 outputs a signal on line 214a which changes if the current in the sealing head 120 deviates from an optimal level. The signal on line 214a controls the output frequency of the VCO 216.

The VCO 216 controls the switching characteristics of the half bridge driver circuit 218, which circuit 218 controls the frequency of the current delivered to the transformer 108 and, ultimately, the frequency of the current delivered to the sealing head 120. Thus, the output frequency of the power supply 200 is a function of current flow in the sealing head 120. As discussed above, if the frequency of the current delivered from the power supply 200 deviates from an optimal level, the current in the sealing head will vary greatly (due to the high Q of the LCR circuit). However, the control circuit of the power supply 200 maintains the current in the sealing head 120 at a desired level (by controlling the frequency of the current delivered thereto) even if the Q of the LCR circuit drifts or the output frequency of the power supply 200 attempts to deviate from an optimal value.

Figure 8A:
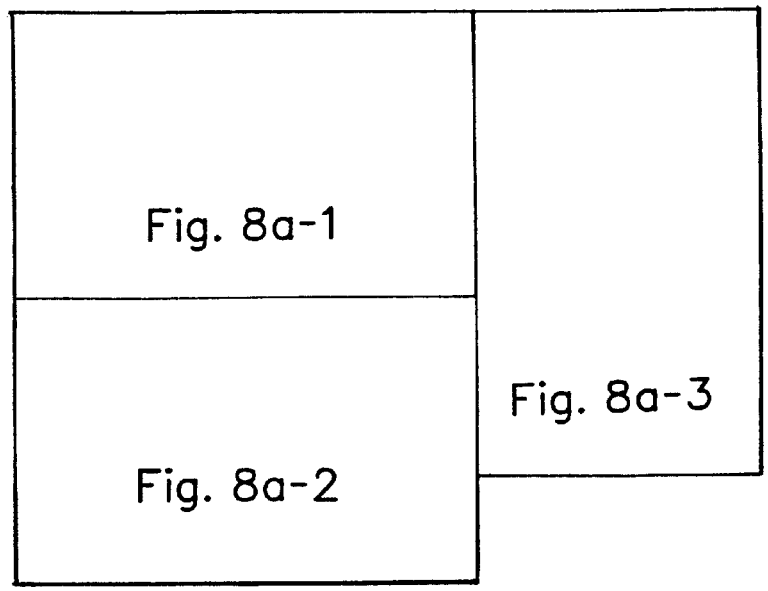
FIGS. 8a–8d show a schematic diagram of one preferred implementation of the power supply of FIG. 7.
Figure 8B:
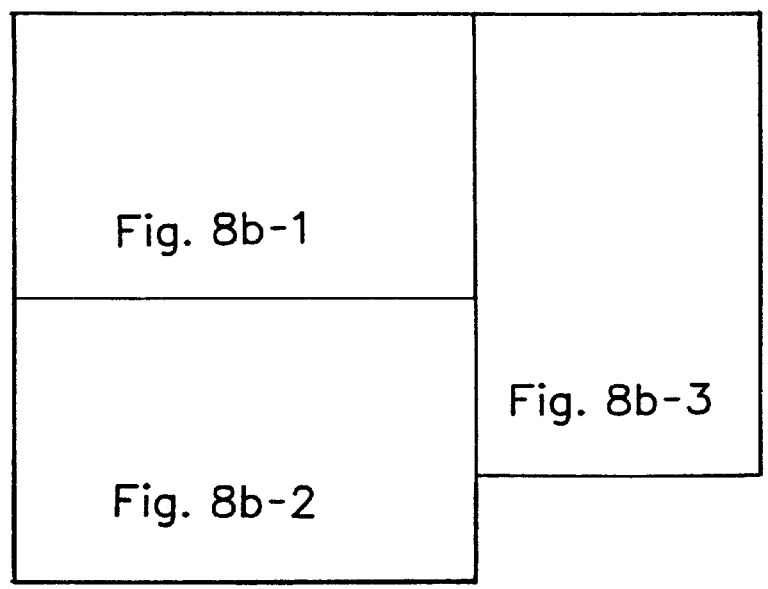
Figures 1, 8A:
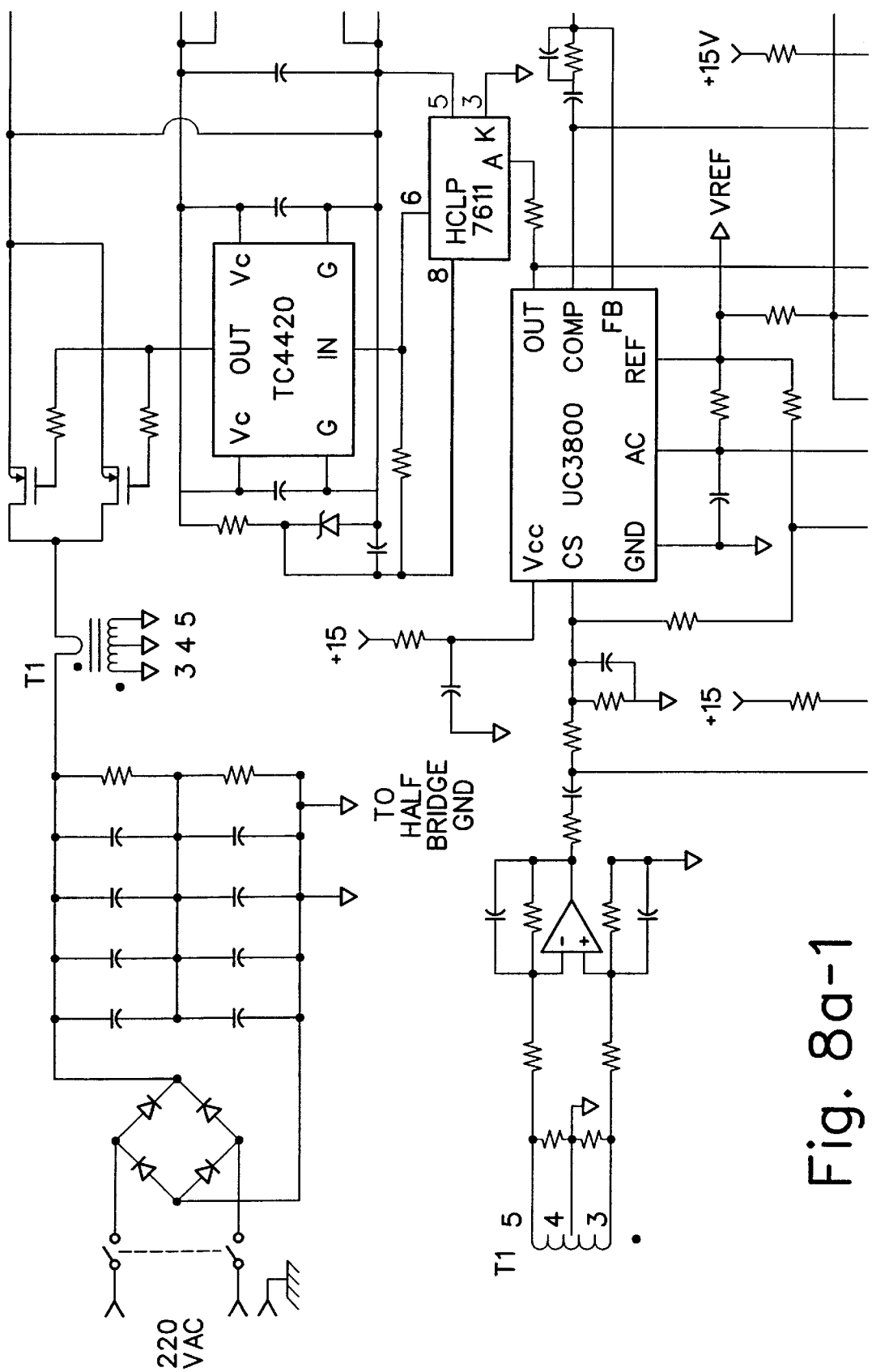
Figures 2, 8A:
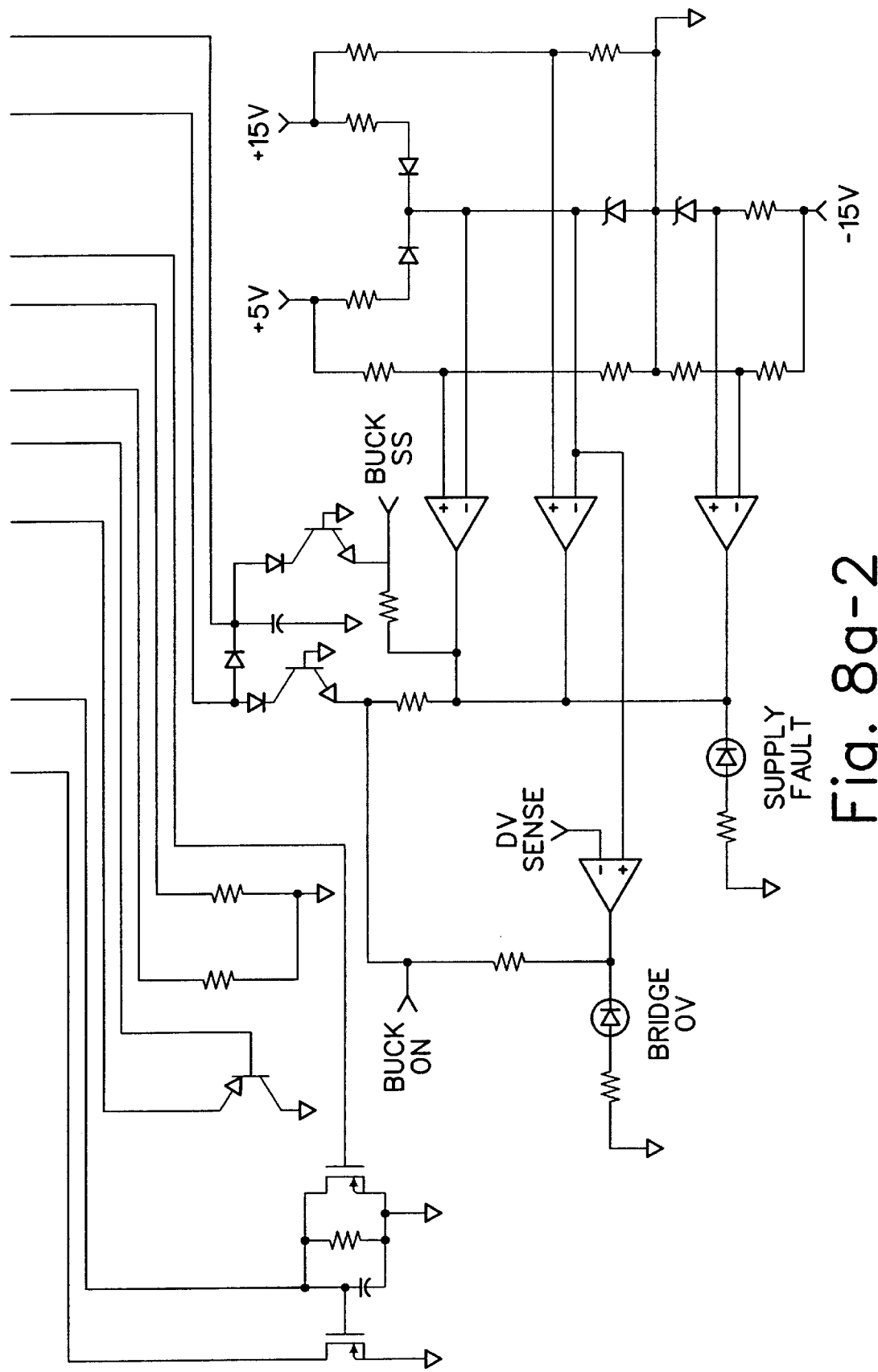
Figures 3, 8A:
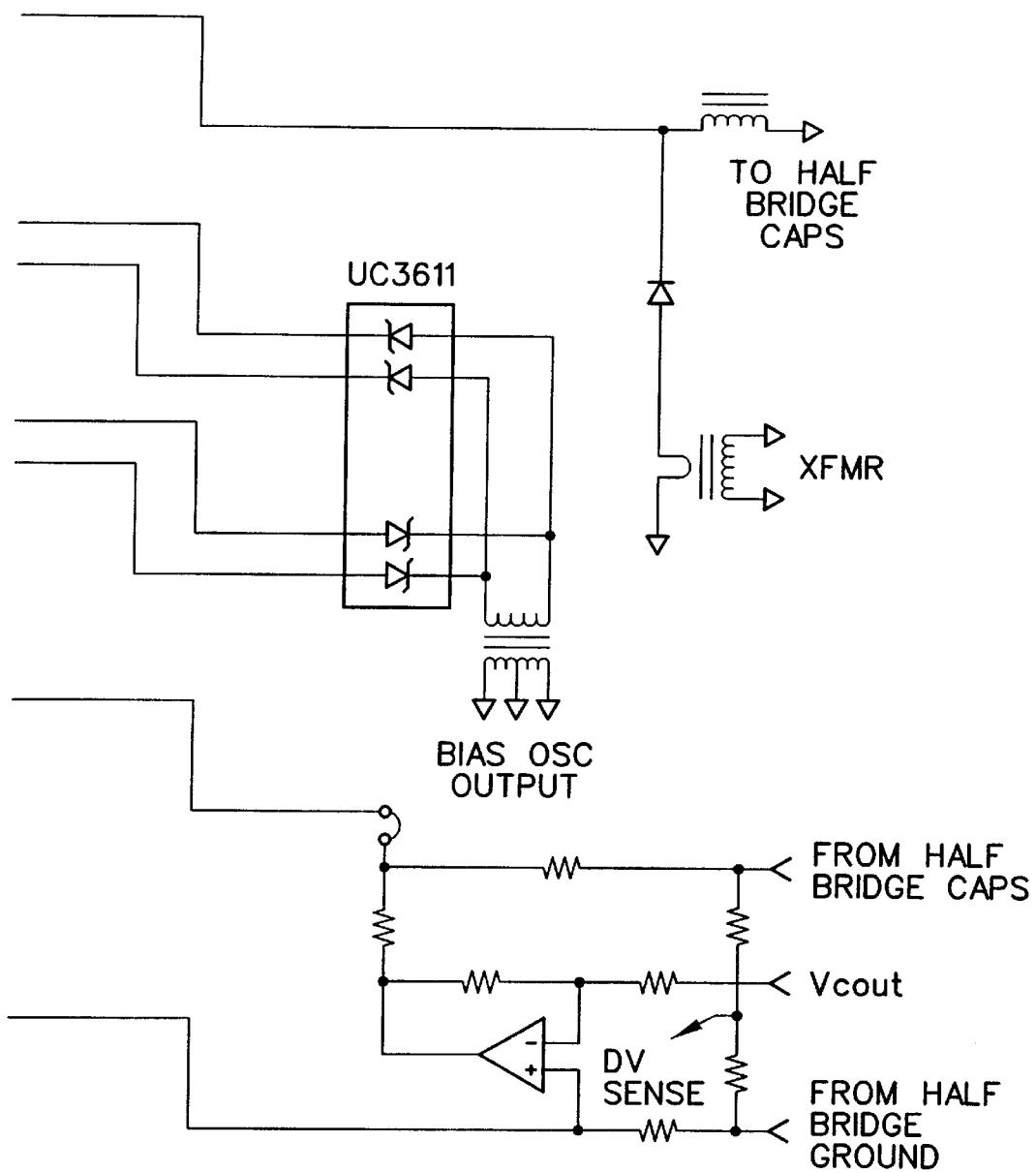
Figures 1, 8B:
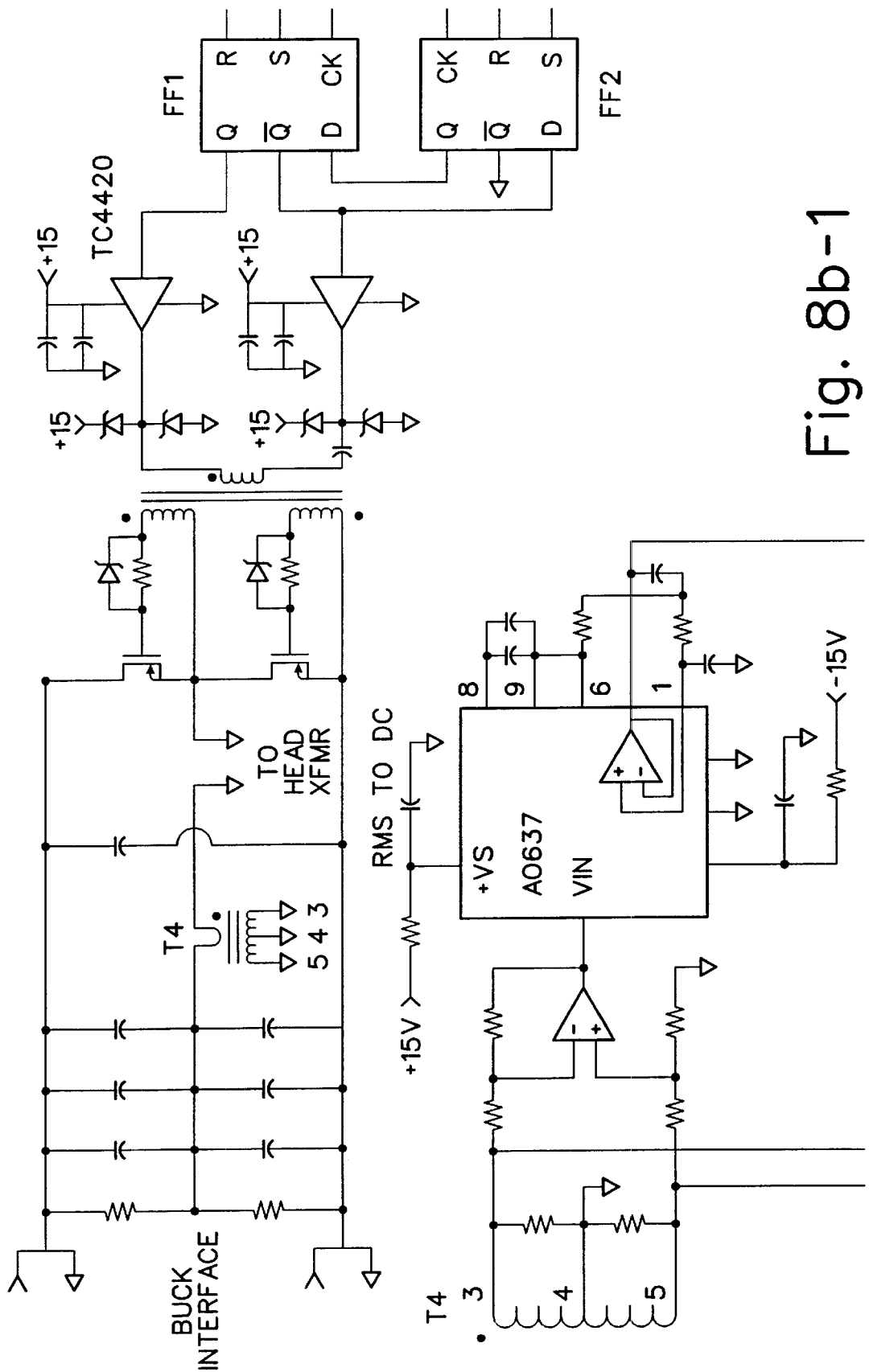
Figures 2, 8B:
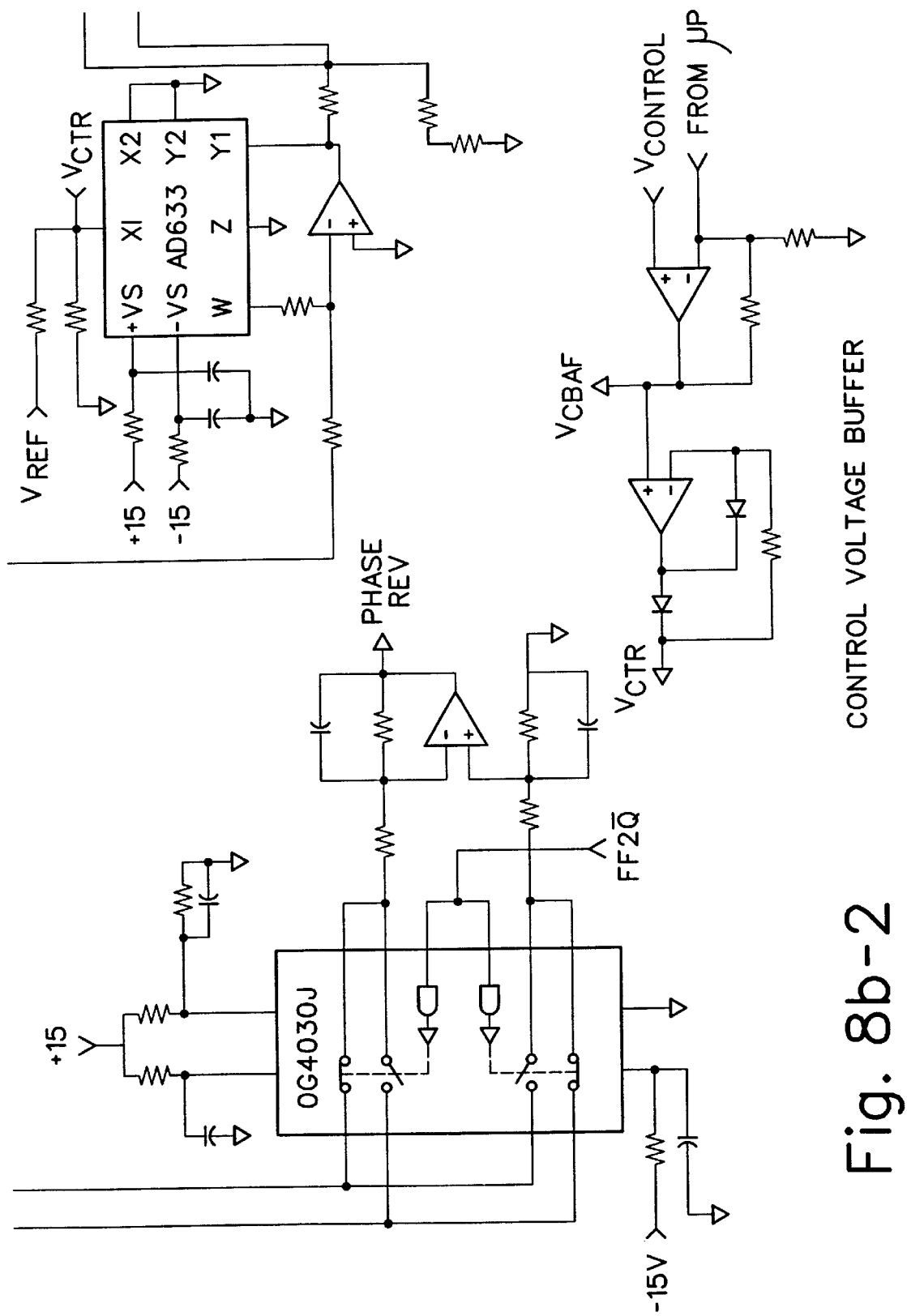
Figures 3, 8B:
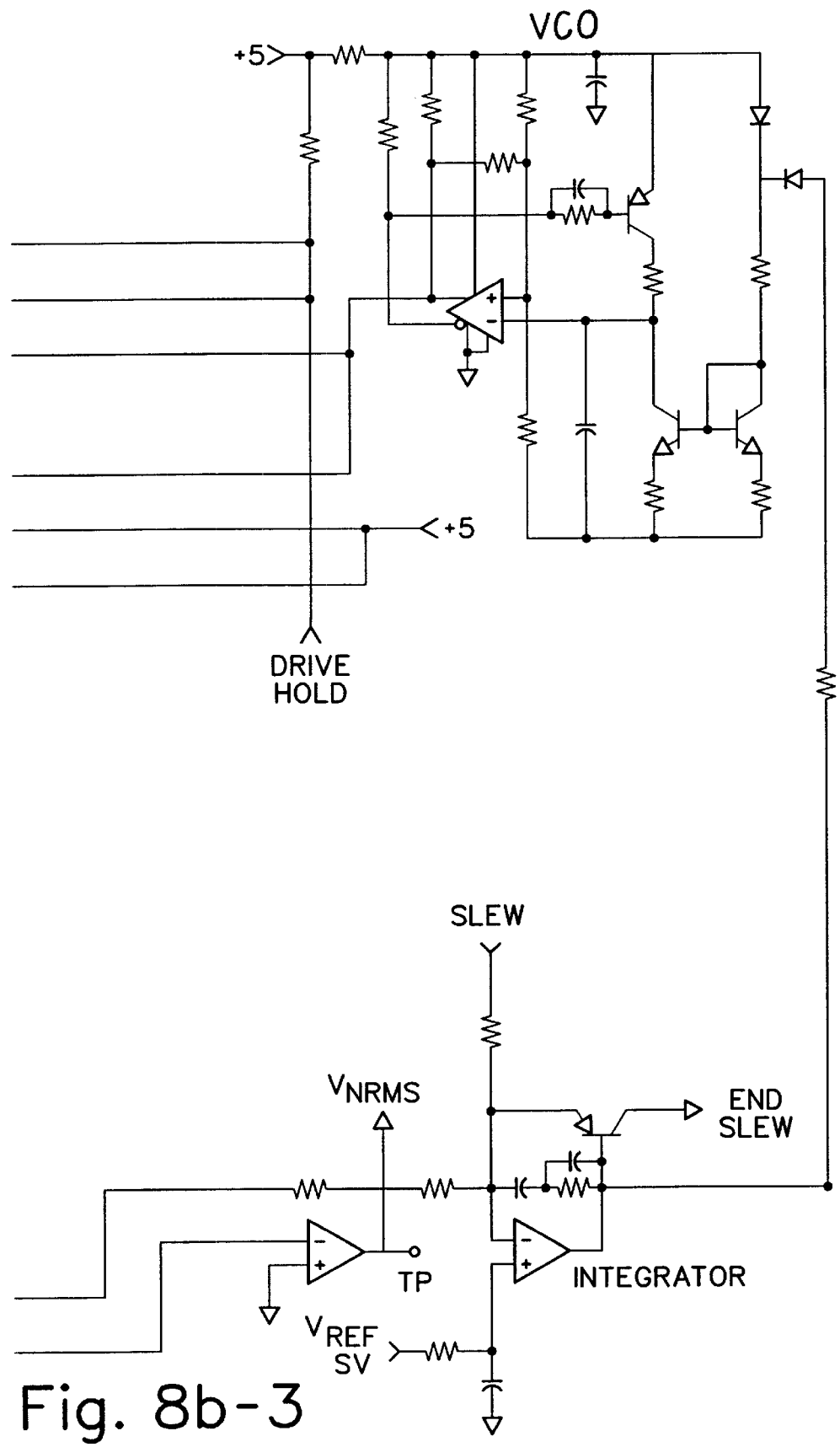
Figure 8C:
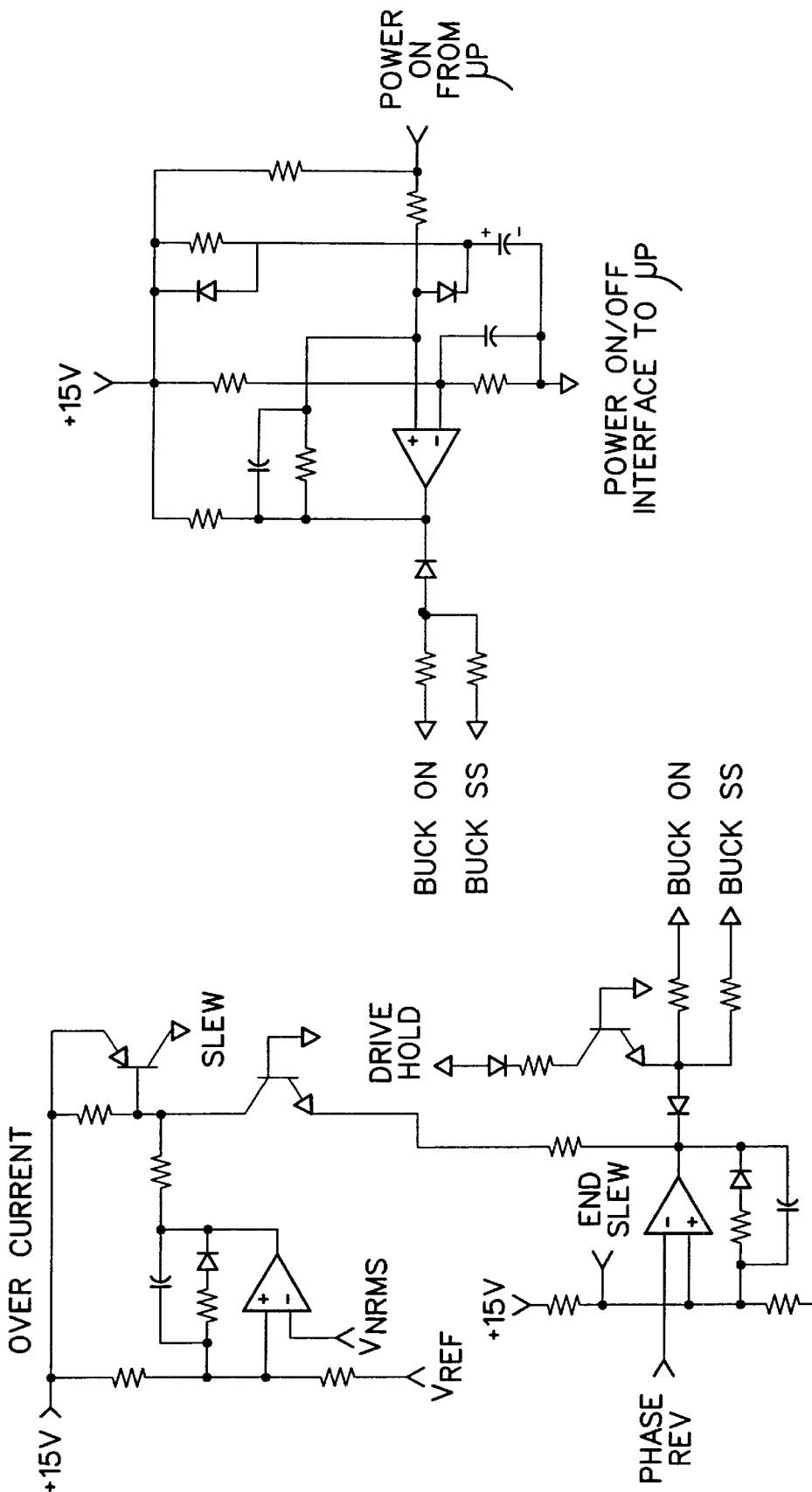
Figure 8D:
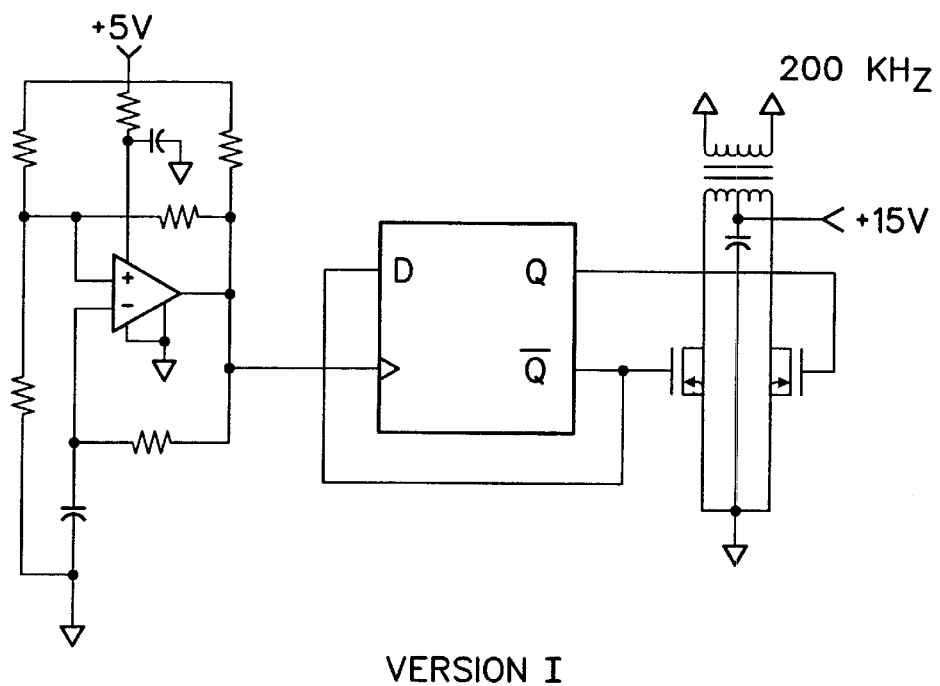
Figure 8D:
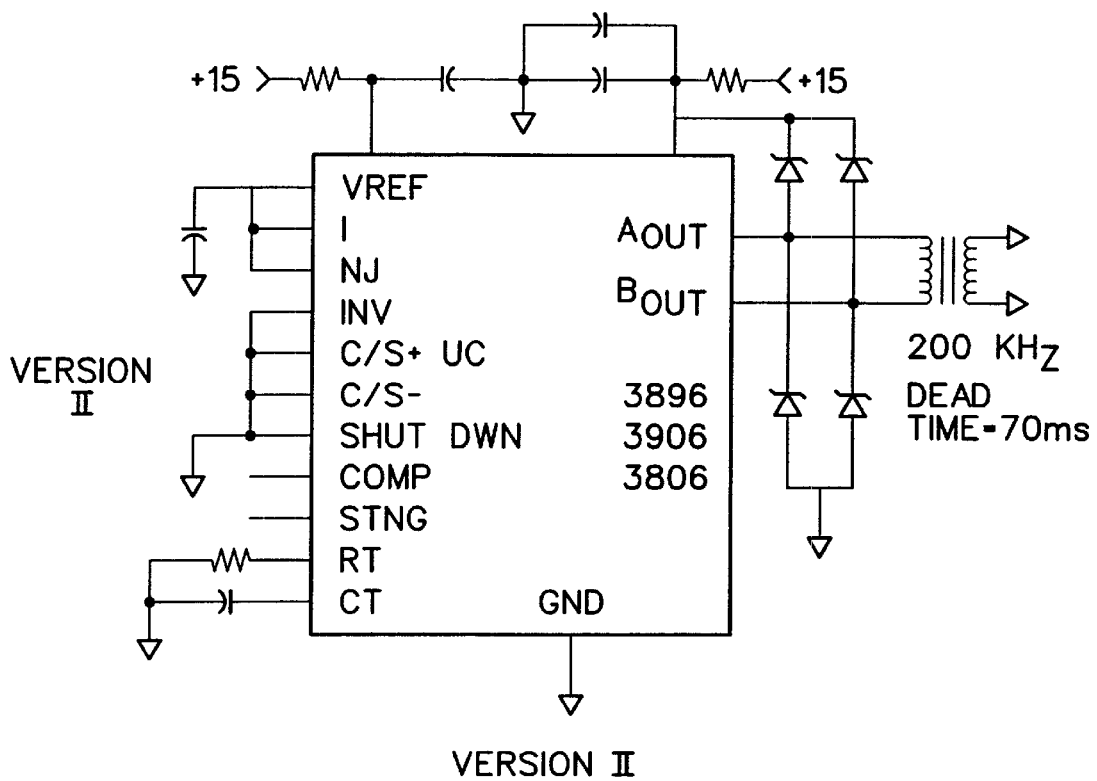

FIGS. 8a–8c are included to show specific circuit diagrams of electronics which can produce the function of the power supply 200 as described above. It is noted that the specific circuit components and interconnections shown in FIGS. 8a–8c merely represent one workable embodiment of the power supply 200 and the invention is in no way limited thereby.

Figure 4B:
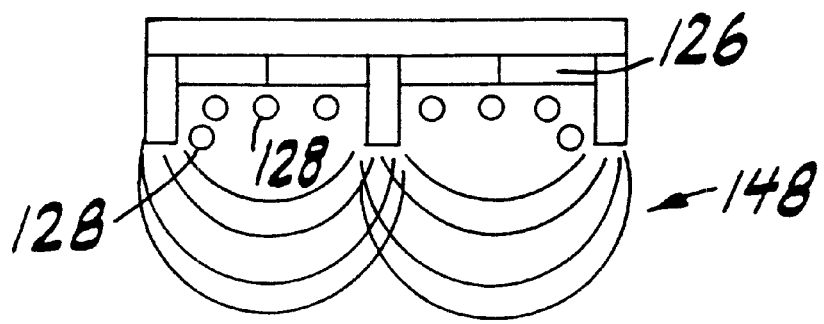
FIG. 4b is a side elevational view of FIG. 4a which includes a schematic representation of the flux lines of an electromagnetic field produced by the coil and ferrite core of the sealing head.

Referring no to FIG. 4a, the litz wire coil 128 is disposed around the ferrite core 126 to channel the electromagnetic field and direct the field flux 148 (FIG. 4b) towards the foil liner 23 for proper performance. The litz wire 128 is coiled around the ferrite core 126 such that the electromagnetic field developed around the litz wire 128 is channeled into the ferrite core 126. The positioning and shape of the ferrite core 126 within the frame 124 directs the electromagnetic field to propagate near an end of the container 20 to be sealed (FIGS. 3–3g and 4b).

The high currents flowing in the litz wire coil 128 and the resultant high electromagnetic field which is concentrated within the ferrite core 126 cause an elevation in the temperatures of the coil 128 and the core 126 which results in an overall rise in the temperature of the sealing head 120. The coil heatsink 122 operates to dissipate the heat that is generated within the ferrite core 126 and the litz wire coil 128. As discussed above, the ferrite core 126 is advantageously provided with slots 127 which are preferably filled with a high thermal conductivity ceramic material to carry heat from the ferrite core 126 to the heatsink 122.

Advantageously, the litz wire coil 128 has a very low resistance to the flow of current therein as compared to conventional copper tubing used in prior art devices. More specifically, since high frequency currents tend to flow near the surface of wire (known as the "skin effect") the use of multi-strand litz wire in the coil 128 reduces the resistance of the coil 128 to current flow. Litz wire having about 4,000 strands of individually insulated conductors have been available commercially. However, it is most preferred that litz wire having about 10,000 insulated strands therein be used in the litz wire core 128. Such 10,000 strand litz wire can be made by any of the known suppliers.

Thus, in accordance with the preferred embodiment of the present invention, the litz wire coil 128 is sized such that the effective resistance per unit length is only about 0.1–0.01 of the resistance per unit length of the copper tubing of the prior art. Consequently, the heat produced within the litz wire coil 128 (due to $I^2R$ losses) is reduced by a factor of 10–100 and water cooling of the sealing head 120 is not required. Indeed, the coil heatsink 122 provides all the heat dissipation necessary to safely and efficiently operate the induction sealing unit 100.

With reference to FIG. 2a, in order to enhance the operation of the coil heatsink 122 and the safe operation of the induction sealing unit 100, heat must be removed from the coil heatsink 122 and the housing 102. This is accomplished by drawing cool air into vent slots 112 by the fan 104 in the direction shown by arrow A1. Next, the air passes over the capacitor 106 (i.e., over the fins of the heatsink 106a), the transformer 108 and the fins 123 of the coil heatsink 122 in the direction shown by arrow A2. The air removes heat from the fins of the heatsink 106a, the transformer 108 and, most importantly, the fins 123 of the heatsink 122.

The use of the litz wire coil 128 improves the efficiency of the sealing head 100 and reduces the amount of heat that must be removed from, for example, the capacitor heatsink 106a and the coil heatsink 122. Consequently, the capacitor 106, the coil 128 and ferrite core 126 may be cooled using only air, which is an advantage over the water cooling of the prior art.

The air that has passed over the heatsink fins 123 then moves into an upper volume 100a of the induction sealing unit 100 in the direction shown by arrow A3. It is preferred that the power supply (control electronics and solid state switching components) be disposed in the upper volume 100 of the sealing unit 100.

Next, the air moves across the upper volume 100 of the sealing unit 100 in the direction of arrow A4 (preferably removing heat from the power supply 109). Lastly, the air moves past a baffle member 113 in the direction shown by arrow A5 and through opening 114 into the atmosphere. Thus, heat generated by the sealing head 120 is removed therefrom, thereby maintaining the sealing head 120 at a safe operating temperature without requiring water cooling as in the prior art.

Referring again to FIG. 2a, a second fan (not shown) may be disposed in the upper volume 100a of the sealing unit to assist in moving the air in the direction of arrow A4.

Figure 2C:
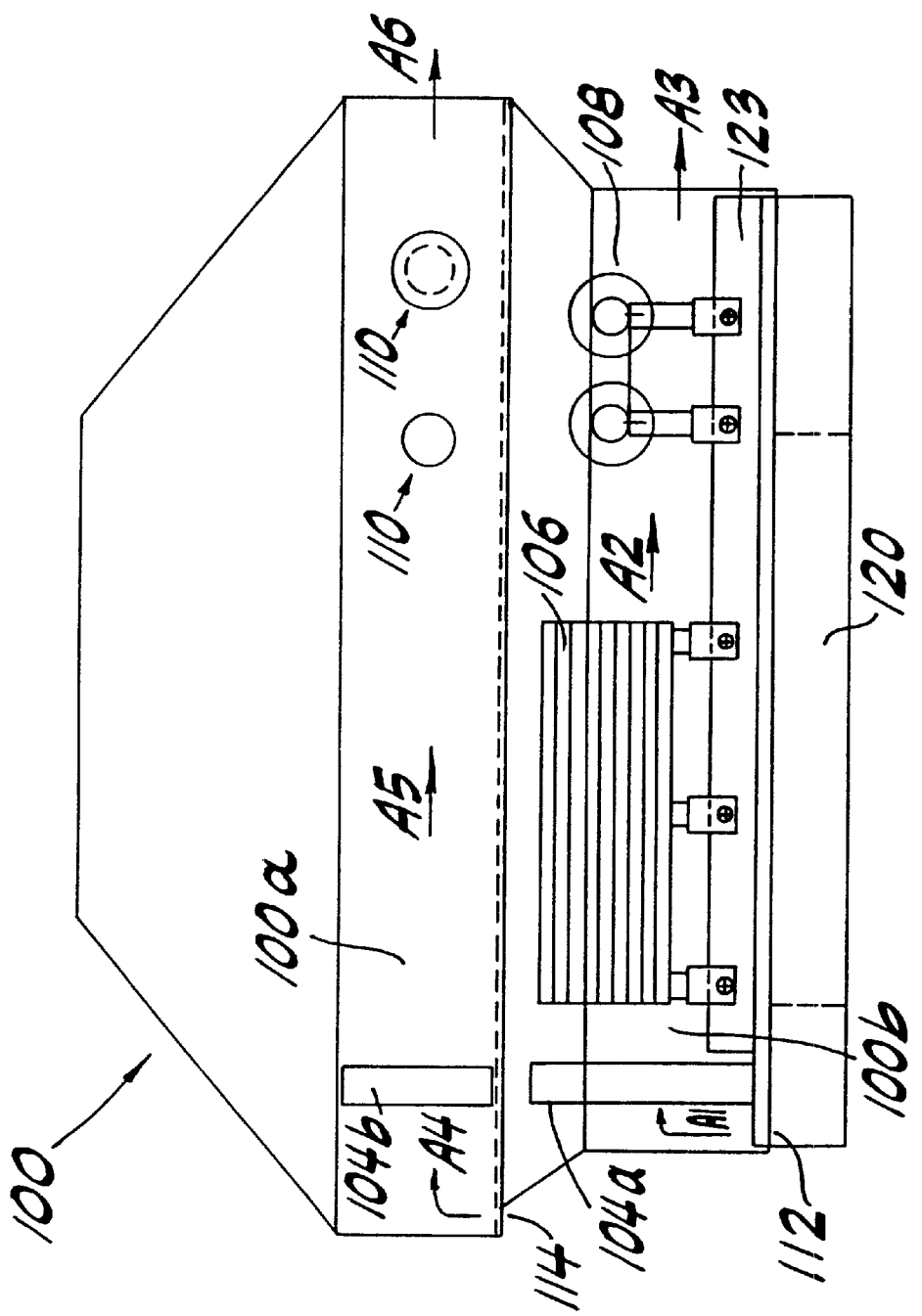

Referring now to FIG. 2c, in an alternative embodiment, two fans 104a and 104b are disposed in the lower 100b and upper volumes 100a of the sealing unit 100, respectively. Fan 104a pulls air A1 into vent slot 112 and blows the air in the direction of arrow A2 and out a vent at the right side of the sealing unit 100 so that the air may exit the sealing unit 100 at A3. Fan 104b pulls air A4 into vent slot 114 and blows the air in the direction of arrow A5 and out a vent at the right side of the sealing unit 100 so that the air may exit the sealing unit 100 at A6.

With the design of FIG. 2c, pre-heated air is not transferred from the lower volume of the sealing unit 100 to the upper volume. Rather, cool air is independently drawn into the upper and lower volumes of the sealing unit 100 by way of fans 104a and 104b, respectively. This is advantageous because hot air is not carried to the power supply 109 which would heat the power supply unnecessarily.

Figure 2D:
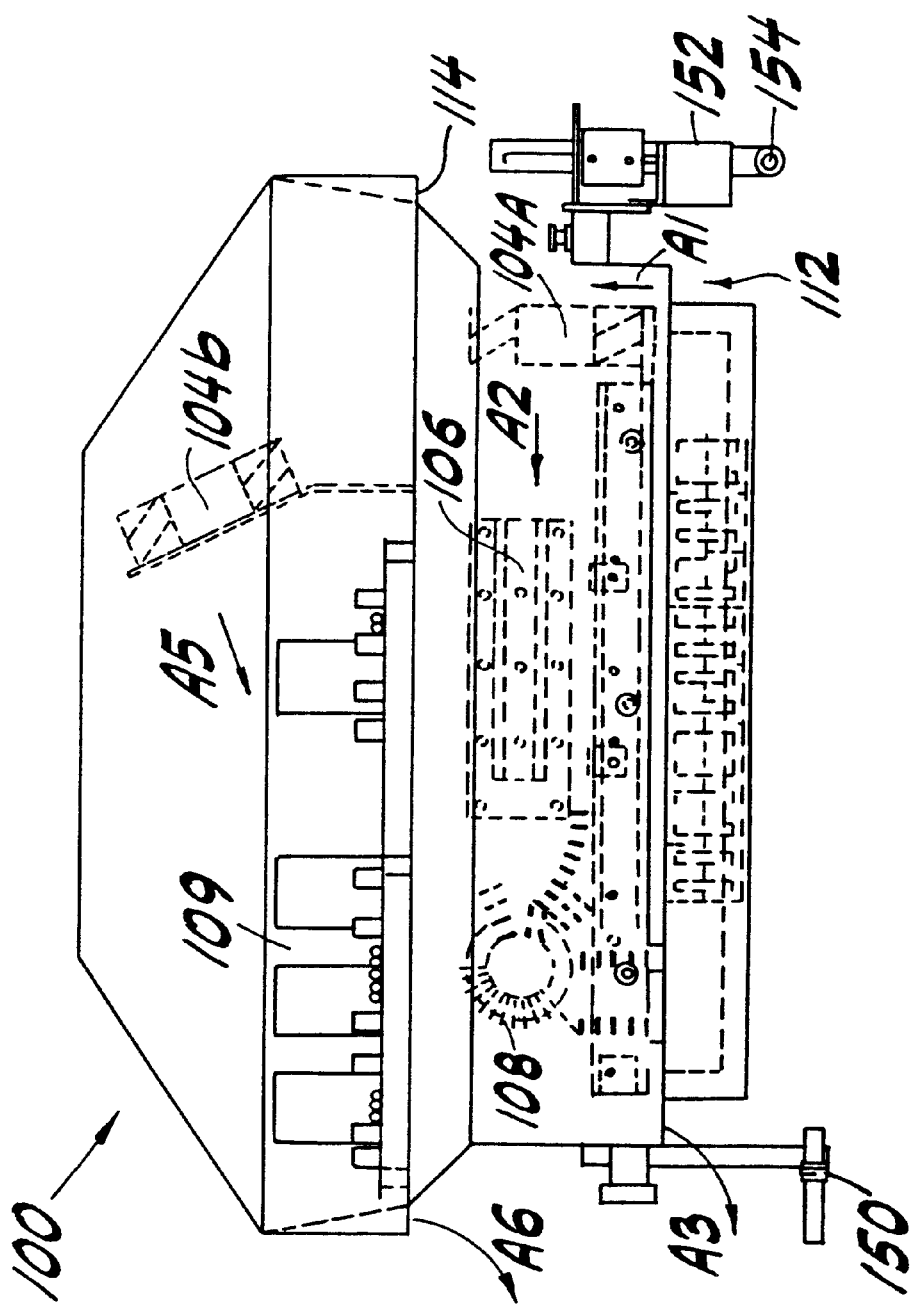

FIG. 2d shows another alternative design for cooling the sealing unit 100. The design shown in FIG. 2d is depicted from the opposite side of the sealing unit 100 than that shown in FIGS. 2a and 2c. The design of FIG. 2d also utilizes two fans 104a and 104b in the upper and lower volumes 100a, 100b of the sealing unit 100, respectively.

In the sealing unit 100 of FIG. 2c, fan 104a pulls air A1 into vent slot 112 and blows the air in the direction of arrow A2 and out a vent at the opposite side of the sealing unit 100 so that the air may exit the sealing unit 100 at A3. Fan 104b pulls air A4 into vent slot 114 and blows the air in the direction of arrow AS, over power supply electronics 109, and out a vent at the opposite side of the sealing unit 100 so that the air may exit the sealing unit 100 at A6.

As was the case with the design of FIG. 2c, in the design of FIG. 2d pre-heated air is not transferred from the lower volume of the sealing unit 100 to the power supply electronics 109 in the upper volume. Rather, cool air is independently drawn into the upper and lower volumes of the sealing unit 100 by way of fans 104a and 104b, respectively.

The sealing head 100 FIG. 2d may include a stall sensor 150 for detecting whether the conveyor 400 has stopped and whether current delivery to the coil 128 should be interrupted. The sealing head 100 of FIG. 2d may also include a missing foil detector 152 and a bottle counting sensor 154 as is known in the art.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A cap sealing unit to seal an opening of a container, the opening being provided with a foil, comprising:
   a frame having a sealing head, the sealing head being adapted to receive the opening of the container;
   a ferrite core disposed within the frame; and
   a litz wire coil disposed proximate to the ferrite core for producing an electromagnetic field within the ferrite core, the ferrite core and litz wire coil being adapted to direct the electromagnetic field toward a foil to seal an opening of a container with the foil.

2. The cap sealing unit of claim 1, wherein the foil is electrically conductive.

3. The cap sealing unit of claim 1, wherein the field causes the foil to heat and fuse to the container.

4. The cap sealing unit of claim 1, wherein the field causes the foil to heat and melt the container proximate to the opening to fuse the foil to the container.

5. The cap sealing unit of claim 1, wherein the litz wire coil is substantially filled with strands of substantially fine, individually insulated conductors.

6. The cap sealing unit of claim 5, wherein the litz wire coil includes about 10,000 strands of substantially fine, individually insulated conductors.

7. The cap sealing unit of claim 6, wherein the litz wire coil includes an insulating sheath which substantially encapsulates the strands such that the strands are electrically insulated from the ferrite core.

8. The cap sealing unit of claim 7, wherein the insulating sheath is formed of at least one of polyethylene, polypropylene or polytetrafluoroethylene.

9. The cap sealing unit of claim 1, wherein the resistance per unit length of the litz wire coil is about 0.1 to 0.01 of the resistance per unit length of copper tubing.

10. The cap sealing unit of claim 1, wherein the ferrite core and litz wire coil are adapted to form a substantially U-shaped recess for receiving the container.

11. The cap sealing unit of claim 10, wherein the U-shaped recess forms a tunnel.

12. The cap sealing unit of claim 10, wherein the ferrite core of the U-shaped recess comprises:
   a substantially horizontally directed portion; and
   two oppositely disposed and substantially vertically directed portions extending from respective edges of the horizontal portion, the vertically directed portions being adapted to direct the electromagnetic field toward the container.

13. The cap sealing unit of claim 1, wherein the ferrite core comprises a plurality of individual ferrite cores arranged in proximity to one another.

14. The cap sealing unit of claim 13, wherein the plurality of ferrite cores include E cores or I cores.

15. The cap sealing unit of claim 14, wherein the cores are disposed on a thermally conductive plate.

16. The cap sealing unit of claim 15, further comprising a heatsink operatively coupled to the plate and adapted to draw and dissipate heat from the plate.

17. The cap sealing unit of claim 13, further including a heatsink coupled to the frame, wherein at least some of the ferrite cores are operatively coupled to the heatsink for transferring heat thereto.

18. The cap sealing unit, comprising:
   a frame;
   a ferrite core disposed within the frame;
   a litz wire coil disposed proximate to the ferrite core for producing an electromagnetic field within the ferrite core, the ferrite core and litz wire coil being adapted to direct the electromagnetic field toward a foil to seal an opening of a container with the foil; wherein the ferrite core and litz wire coil are adapted to form a substantially U-shaped recess for receiving the container; and wherein the ferrite core of the U-shaped recess comprises:
   a substantially horizontally directed portion;
   two oppositely disposed and substantially vertically directed portions extending from respective edges of the horizontal portion, the vertically directed portions being adapted to direct the electromagnetic field toward the container; and
   a center spine portion extending substantially vertically from the horizontal portion but between the oppositely disposed vertical portions.

19. The cap sealing unit, comprising:

a frame;

a ferrite core disposed within the frame;

a litz wire coil disposed proximate to the ferrite core for producing an electromagnetic field within the ferrite core, the ferrite core and litz wire coil being adapted to direct the electromagnetic field toward a foil to seal an opening of a container with the foil; wherein the ferrite core and litz wire coil are adapted to form a substantially U-shaped recess for receiving the container; and wherein the ferrite core of the U-shaped recess comprises:

a substantially horizontally directed portion;

two oppositely disposed and substantially vertically directed portions extending from respective edges of the horizontal portion, the vertically directed portions being adapted to direct the electromagnetic field toward the container; and at least one inwardly directed portion extending from the lower edge of at least one of the oppositely disposed vertically directed portions, the inwardly directed portion being adapted to direct the field toward the container.

20. The cap sealing unit, comprising:

a frame;

a heat sink coupled to the frame;

a ferrite core disposed within the frame; and a litz wire coil disposed proximate to the ferrite core for producing an electromagnetic field within the ferrite core, the ferrite core and litz wire coil being adapted to direct the electromagnetic field toward a foil to seal an opening of a container with the foil; wherein the ferrite core comprises a plurality of individual ferrite cores arranged in proximity to one another; and wherein at least some of the ferrite cores are operatively coupled to the heatsink for transferring heat thereto; and wherein the heatsink includes fins for transferring heat from the heatsink to air passing over the fins.

21. The cap sealing unit of claim 20, further comprising a housing, the heatsink extending at least partially into the housing.

22. The cap sealing unit of claim 21, further comprising a first fan coupled to the housing for blowing air over the fins.

23. The cap sealing unit of claim 22, wherein the first fan pulls air through an opening in the housing such that the air flows over the fins of the heatsink and then out through a vent in the housing.

24. A cap sealing unit to seal an opening of a container, the opening being provided with a foil, comprising:

a frame having a sealing head, the sealing head being adapted to receive the opening of the container;

a ferrite core disposed within the frame; and a litz wire coil disposed proximate to the ferrite core for producing an electromagnetic field within the ferrite core, the ferrite core and litz wire coil forming a recess to receive the opening of the container, the recess adapted to direct the electromagnetic field toward the foil to seal the opening of the container with the foil.

25. The cap sealing unit of claim 24, wherein the foil is electrically conductive.

26. The cap sealing unit of claim 24, wherein the field causes the foil to heat and fuse to the container.

27. The cap sealing unit of claim 24, wherein the field causes the foil to heat and melt the container proximate to the opening to fuse the foil to the container.

28. The cap sealing unit of claim 24, wherein the litz wire coil is substantially filled with strands of substantially fine, individually insulated conductors.

29. The cap sealing unit of claim 28, wherein the litz wire coil includes about 10,000 strands of substantially fine, individually insulated conductors.

30. The cap sealing unit of claim 29, wherein the litz wire coil includes an insulating sheath which substantially encapsulates the strands such that the strands are electrically insulated from the ferrite core.

31. The cap sealing unit of claim 30, wherein the insulating sheath is formed of at least one of polyethylene, polypropylene or polytetrafluoroethylene.

32. The cap sealing unit of claim 24, wherein the resistance per unit length of the litz wire coil is about 0.1 to 0.01 of the resistance per unit length of copper tubing.

33. The cap sealing unit of claim 24, wherein the ferrite core and litz wire coil are adapted to form a substantially U-shaped recess for receiving the container.

34. The cap sealing unit of claim 24, wherein the recess forms a tunnel.

35. The cap sealing unit of claim 24, wherein the ferrite core of the recess comprises:

a substantially horizontally directed portion; and two oppositely disposed and substantially vertically directed portions extending from respective edges of the horizontal portion, the vertically directed portions being adapted to direct the electromagnetic field toward the container.

36. The cap sealing unit of claim 24, wherein the ferrite core comprises a plurality of individual ferrite cores arranged in proximity to one another.

37. The cap sealing unit of claim 36, wherein the plurality of ferrite cores include E cores or I cores.

38. The cap sealing unit of claim 37, wherein the cores are disposed on a thermally conductive plate.

39. The cap sealing unit of claim 38, further comprising a heatsink operatively coupled to the plate and adapted to draw and dissipate heat from the plate.

40. The cap sealing unit of claim 36, further including a heatsink coupled to the frame, wherein at least some of the ferrite cores are operatively coupled to the heatsink for transferring heat thereto.

41. The cap sealing unit of claim 24, wherein the recess causes the electromagnetic field to at least partially surround the opening portion.

42. The cap sealing unit of claim 24, wherein the recess is substantially U-shaped.

43. The cap sealing unit, comprising:

a frame;

a ferrite core disposed within the frame; and a litz wire coil disposed proximate to the ferrite core for producing an electromagnetic field within the ferrite core, the ferrite core and litz wire coil forming a recess to receive an opening portion of a container and a foil located proximate to the opening portion, the recess adapted to direct the electromagnetic field toward the foil to seal the opening of the container with the foil; wherein the ferrite core of the recess comprises:

a substantially horizontally directed portion;

two oppositely disposed and substantially vertically directed portions extending from respective edges of the horizontal portion, the vertically directed portions being adapted to direct the electromagnetic field toward the container; and a center spine portion extending substantially vertically from the horizontal portion but between the oppositely disposed vertical portions.

44. The cap sealing unit, comprising:

a frame;

a ferrite core disposed within the frame; and a litz wire coil disposed proximate to the ferrite core for producing an electromagnetic field within the ferrite core, the ferrite core and litz wire coil forming a recess to receive an opening portion of a container and a foil located proximate to the opening portion, the recess adapted to direct the electromagnetic field toward the foil to seal the opening of the container with the foil;

wherein the ferrite core of the recess comprises:

a substantially horizontally directed portion;

two oppositely disposed and substantially vertically directed portions extending from respective edges of the horizontal portion, the vertically directed portions being adapted to direct the electromagnetic field toward the container; and at least one inwardly directed portion extending from the lower edge of at least one of the oppositely disposed vertically directed portions, the inwardly directed portion being adapted to direct the field toward the container.

45. The cap sealing unit, comprising:

a frame;

a heatsink coupled to the frame;

a ferrite core disposed within the frame; and a litz wire coil disposed proximate to the ferrite core for producing an electromagnetic field within the ferrite core, the ferrite core and litz wire coil forming a recess to receive an opening portion of a container and a foil located proximate to the opening portion, the recess adapted to direct the electromagnetic field toward the foil to seal the opening of the container with the foil; wherein the ferrite core comprises a plurality of individual ferrite cores arranged in proximity to one another; and wherein at least some of the ferrite cores are operatively coupled to the heatsink for transferring heat thereto.

46. The cap sealing unit of claim 45, further comprising a housing, the heatsink extending at least partially into the housing.

47. The cap sealing unit of claim 46, further comprising a first fan coupled to the housing for blowing air over the fins.

48. The cap sealing unit of claim 47, wherein the first fan pulls air through an opening in the housing such that the air flows over the fins of the heatsink and then out through a vent in the housing.

* * * * *